US011023906B2

(12) United States Patent
Chao et al.

(10) Patent No.: US 11,023,906 B2
(45) Date of Patent: *Jun. 1, 2021

(54) END-TO-END EFFECTIVE CITIZEN ENGAGEMENT VIA ADVANCED ANALYTICS AND SENSOR-BASED PERSONAL ASSISTANT CAPABILITY (EECEASPA)

(71) Applicant: International Business Machines Corporation, Armonk, NY (US)

(72) Inventors: Tian-Jy Chao, Bedford, NY (US); Younghun Kim, White Plains, NY (US); Stephen E. Levy, Honolulu, HI (US); Ming Li, Elmsford, NY (US); Milind R. Naphade, Cupertino, CA (US); Sambit Sahu, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 105 days.

This patent is subject to a terminal disclaimer.

(21) Appl. No.: 16/359,587

(22) Filed: Mar. 20, 2019

(65) Prior Publication Data

US 2019/0220876 A1    Jul. 18, 2019

Related U.S. Application Data

(60) Continuation of application No. 15/041,465, filed on Feb. 11, 2016, now Pat. No. 10,318,967, which is a
(Continued)

(51) Int. Cl.
*G06Q 30/00* (2012.01)
*G06Q 30/02* (2012.01)

(52) U.S. Cl.
CPC ..... *G06Q 30/0201* (2013.01); *G06Q 30/0242* (2013.01)

(58) Field of Classification Search
CPC ............ G06Q 30/0242; G06Q 30/0201
(Continued)

(56) References Cited

U.S. PATENT DOCUMENTS 7,908,166 B2    3/2011    Keil et al.
8,135,693 B2    3/2012    Brazier et al.
(Continued)

FOREIGN PATENT DOCUMENTS

EP    1877882 A1    1/2008
WO    2006119112 A1    11/2006
(Continued)

OTHER PUBLICATIONS

Ceolin, Davide; Groth, Paul; Van Hage, Willem Robert; Nottamkandath, Archana Trust Evaluation Through User Reputation and Provenance Analysis 2012 (Year: 2012).*
(Continued)

*Primary Examiner* — Matthew L Hamilton
(74) *Attorney, Agent, or Firm* — Scully, Scott, Murphy & Presser, P.C.; Joseph Petrokaitis

(57) ABSTRACT

Providing an end-to-end citizen engagement, in one aspect, may comprise obtaining data of multiple disintegrated sources from one or more of communication and social computing channels via one or more adapters. Data refactoring and management, integration and process orchestration of the data according to a data model as data attributes of the data model may be provided. One or more analytics may be performed based on the data attributes stored according to the data model and input specified to the one or more analytics. One or more results computed by performing the one or more analytics may be provided. One or more
(Continued)

application logics supporting one or more front-end applications may be produced. One or more front-end applications for automated sensing of user activities and sensor-based individual assistant capability may be provided.

18 Claims, 23 Drawing Sheets

Related U.S. Application Data division of application No. 14/185,359, filed on Feb. 20, 2014, now Pat. No. 9,524,505.

(60) Provisional application No. 61/807,087, filed on Apr. 1, 2013.

(58) Field of Classification Search
USPC .......................................................... 705/14
See application file for complete search history.

(56) References Cited

U.S. PATENT DOCUMENTS

| | | | |
|---|---|---|---|
| 8,306,937 B2 | 11/2012 | Otto et al. | |
| 8,313,383 B1 | 11/2012 | Bordier | |
| 8,417,558 B2 | 4/2013 | Koonce et al. | |
| 8,635,099 B1 | 1/2014 | Floyd et al. | |
| 8,725,597 B2 | 5/2014 | Mauseth et al. | |
| 9,171,338 B2* | 10/2015 | Chrapko | H04L 67/36 |
| 9,264,329 B2 | 2/2016 | Chrapko et al. | |
| 2002/0046096 A1 | 4/2002 | Srinivasan et al. | |
| 2004/0133463 A1 | 7/2004 | Benderev | |
| 2004/0203989 A1 | 10/2004 | Karaoguz | |
| 2004/0230989 A1 | 11/2004 | Macey et al. | |
| 2006/0031510 A1 | 2/2006 | Beck et al. | |
| 2006/0155513 A1 | 7/2006 | Mizrahi et al. | |
| 2007/0094601 A1 | 4/2007 | Greenberg et al. | |
| 2007/0099162 A1 | 5/2007 | Sekhar | |
| 2008/0189408 A1 | 8/2008 | Cancel et al. | |
| 2009/0064293 A1* | 3/2009 | Li | G06Q 10/10 726/6 |
| 2009/0106084 A1 | 4/2009 | Or | |
| 2009/0164263 A1 | 6/2009 | Marlow et al. | |
| 2010/0076987 A1* | 3/2010 | Schreiner | G06Q 30/06 707/754 |
| 2010/0088340 A1 | 4/2010 | Muller et al. | |
| 2010/0106558 A1 | 4/2010 | Li et al. | |
| 2010/0235886 A1 | 9/2010 | Muller et al. | |
| 2011/0145043 A1 | 6/2011 | Handel | |
| 2011/0191417 A1 | 8/2011 | Rathod | |
| 2011/0251876 A1 | 10/2011 | Fisher | |
| 2012/0109714 A1 | 5/2012 | Azar | |
| 2012/0166253 A1 | 6/2012 | Yerkovich | |
| 2012/0226743 A1 | 9/2012 | Smargon | |
| 2012/0246102 A1* | 9/2012 | Sudharsan | G06N 7/005 706/25 |
| 2012/0316921 A1 | 12/2012 | Carsanaro et al. | |
| 2013/0004933 A1 | 1/2013 | Bhaskaran | |
| 2013/0024263 A1 | 1/2013 | Otto et al. | |
| 2013/0090565 A1 | 4/2013 | Quy | |
| 2013/0111323 A1 | 5/2013 | Taghaddos et al. | |
| 2013/0117040 A1 | 5/2013 | James et al. | |
| 2013/0117043 A1 | 5/2013 | Condon et al. | |
| 2013/0211852 A1 | 8/2013 | Roizen et al. | |
| 2013/0280682 A1 | 10/2013 | Levine et al. | |
| 2013/0298038 A1 | 11/2013 | Spivack et al. | |
| 2014/0100918 A1 | 4/2014 | Rosenberger et al. | |
| 2014/0128691 A1 | 5/2014 | Olivier | |
| 2014/0200908 A1 | 7/2014 | Moore et al. | |
| 2014/0280751 A1* | 9/2014 | Lo | H04W 4/08 709/219 |
| 2014/0358636 A1 | 12/2014 | Nowak et al. | |
| 2015/0066958 A1 | 3/2015 | Krusell et al. | |
| 2015/0081417 A1 | 3/2015 | Golden et al. | |
| 2015/0294377 A1 | 10/2015 | Chow | |
| 2015/0364057 A1 | 12/2015 | Catani et al. | |
| 2016/0055760 A1 | 2/2016 | Mirabile | |
| 2016/0171180 A1 | 6/2016 | Yagnyamurthy et al. | |
| 2016/0188821 A1 | 6/2016 | Ozeran | |
| 2016/0210427 A1 | 7/2016 | Mynhier et al. | |

FOREIGN PATENT DOCUMENTS

| | | |
|---|---|---|
| WO | 2008021704 A2 | 2/2008 |
| WO | 2009055385 A1 | 4/2009 |
| WO | 2012014161 A1 | 2/2012 |

OTHER PUBLICATIONS

Office Action dated Apr. 23, 2019 received in U.S. Appl. No. 14/201,081, 50 pages.

IBM, Process for Deriving Aggregated Group Status Metrics from a Set of User Status Data, IP.com Prior Art Database Technical Disclosure, Apr. 2009, pp. 1-2, IPCOM000181443D, http://ip.com/IPCOM/000181443.

Disclosed Anonymously, Generating "Interesting" Social Incentives to Attract Traffic to Online Polls, IP.com Prior Art Database Technical Disclosure, Oct. 2010, pp. 1-5, IPCOM000200263D, http://ip.com/IPCOM/000200263.

Gelman, A., et al., "Regression Modeling and Meta-Analysis for Decision Making: A Cost-Benefit Analysis of Incentives in Telephone Surveys", Journal of Business & Economic Statistics, American Statistical Association, Apr. 2003, 3 pages.

Chen, W. et al. "Social Network Collaborative Filtering Framework and Online Trust Factors: a Case Study on Facebook", Digital Information Management (ICDIM), (2010), ieeexplore.ieee.org, pp. 266-276.

Chen, S. et al., "Collaborative Filtering with Fine-grained Trust Metric", CIDM'09 (2009), ieeexplore.iee.org, 8 pages.

Kim, Y.A. et al., "Modeling Trust in Online Social Networks to Improve Adolescent Health Behaviors", cs.umn.edu, (2010), 53 pages.

Stumme, G. et al., "Semantic Web Mining State of the art and future directions", Web Semantics: Science, Services and Agents on the World Wide Web 4, (2006), pp. 124-143.

Thilagam, P.S. et al., "Applications of Social Network Analysis", Handbook of Social Network Technologies and Applications, 2010), Chapter 29, pp. 637-649.

McGrory, A., "7 Steps to introducing a wellness program", Summit Business Media, Jun. 2012, 4 pages, vol. 32, Issue 6.

U.S. Office Action dated Aug. 23, 2019 issued in U.S. Appl. No. 14/201,081, 48 pages.

Office Action dated Jul. 16, 2020 received in U.S. Appl. No. 14/201,081, 11 pages.

Office Action dated Mar. 26, 2020 received in U.S. Appl. No. 14/201,081, 13 pages.

* cited by examiner

END-TO-END EFFECTIVE CITIZEN ENGAGEMENT VIA ADVANCED ANALYTICS AND SENSOR-BASED PERSONAL ASSISTANT CAPABILITY (EECEASPA)

CROSS-REFERENCE TO RELATED APPLICATIONS

This application is related to U.S. patent application Ser. No. 14/184,237, now U.S. Pat. No. 10,176,488 entitled "PERTURBATION, MONITORING, AND ADJUSTMENT OF AN INCENTIVE AMOUNT USING STATISTICALLY VALUABLE INDIVIDUAL INCENTIVE SENSITIVITY FOR IMPROVING SURVEY PARTICIPATION RATE", filed on Feb. 19, 2014, U.S. patent application Ser. No. 14/201,081 entitled "ANALYZING A TRUST METRIC OF RESPONSES THROUGH TRUST ANALYTICS", filed on Mar. 7, 2014, and U.S. patent application Ser. No. 14/136,694 entitled "SURVEY PARTICIPATION RATE WITH AN INCENTIVE MECHANISM", filed on Dec. 20, 2013, the entire content and disclosure of which are incorporated by reference herein in their entirety.

BACKGROUND

The present application relates generally to computers, and computer applications, and more particularly to citizen engagement and analytics.

There lacks an end-to-end effective citizen engagement platform that provides real-time analysis of the effectiveness of a citizen engagement, e.g., the progress of a voting activity or individual wellness improvement, to provide individual monitoring, tracking, reminding, and alerting users. Most of the activity monitoring and reporting focus on aggregate progress of the collective users participating in a citizen engagement activity and may only be specially created for the activity administrators.

BRIEF SUMMARY

A method for providing end-to-end citizen engagements, in one aspect, may comprise obtaining data from one or more of communication and social computing channels via one or more adapters. The method may also comprise providing data refactoring and management, integration and process orchestration of the data according to a data model as data attributes of the data model, the data obtained from multiple disintegrated data sources. The method may also comprise performing one or more analytics based on the data attributes stored according to the data model and input specified to the one or more analytics. The method may also comprise providing one or more results computed by performing the one or more analytics. The method may further comprise producing one or more application logics supporting one or more front-end applications. The method may also comprise providing the one or more front-end applications for automated sensing of user activities and sensor-based individual assistant capability.

The system for providing an end-to-end citizen engagement, in one aspect, may comprise a data model comprising a set of data types. An adapter layer may comprise a plurality of adapter executing on a processor and obtaining data from one or more of communication and social computing channels. A factory layer may comprise a computer executable module executing on the processor and adapting, extracting, making inference, reducing and augmenting, and integrating of the data as data attributes of the data model, the data obtained from multiple disintegrated data sources. An engagement analytics layer may comprise a plurality of analytics application programming interfaces that invoke one or more analytics computations based on the data attributes stored according to the data model and input specified to one or more analytics computations. An application logic layer may comprise one or more application logics corresponding to one or more front-end user applications, wherein the one or more results computed by performing the one or more analytics are provided to the user via the application logic layer and the one or more front-end user applications. Front-end applications are provided for automated sensing of user micro activities and sensor-based individual assistant capability.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIGS. 13-26 shows example front end user interface screens in one embodiment of the present disclosure, via which a participant may enter data, view data, and otherwise interact with a citizen engagement platform of the present disclosure in one embodiment.

DETAILED DESCRIPTION

Figure 1:
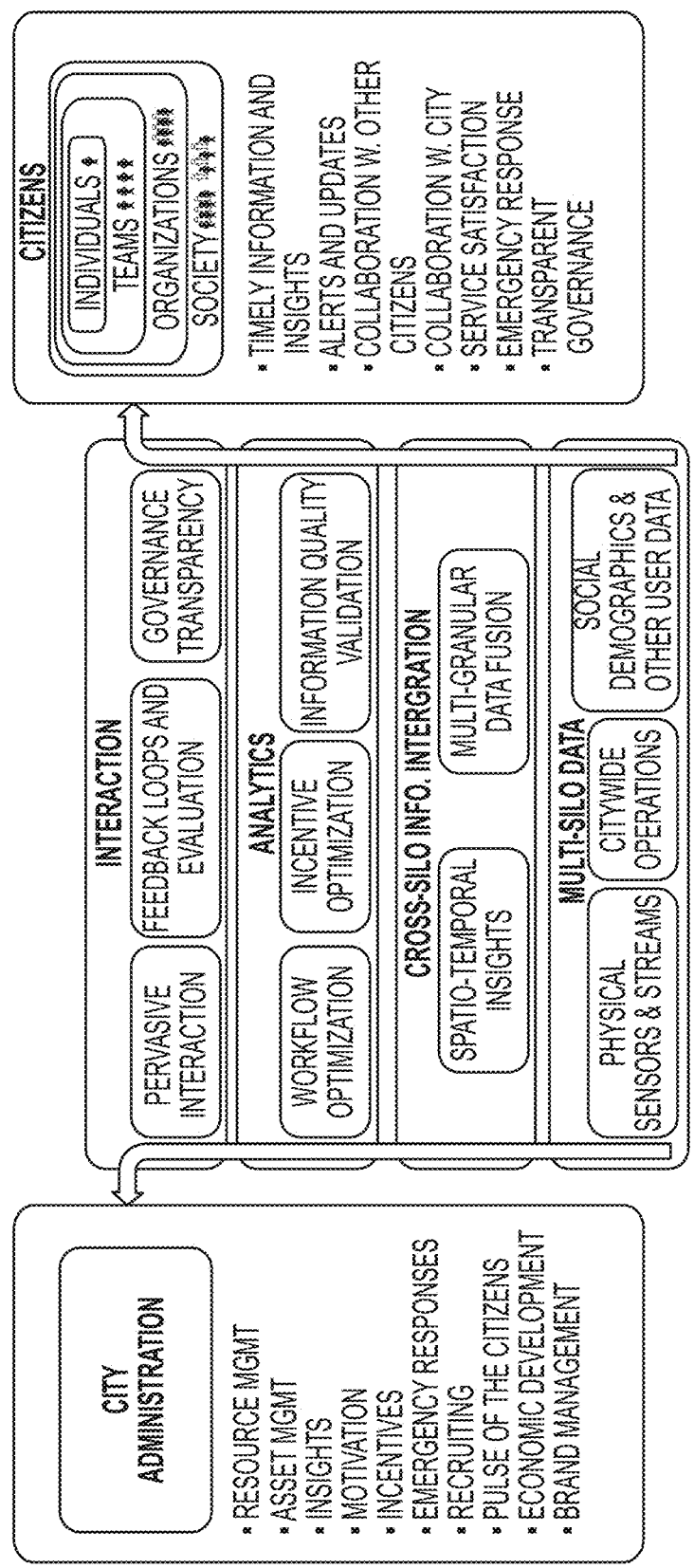
FIG. 1 illustrates in one embodiment a system design overview for providing an end-to-end effective citizen engagement.

Citizen engagement or Activity refers to a city or citizen initiated activity that has goal statement, timeline, and qualification for participation.

Activity Definition may include defining goals, start and end dates, targeted age groups, targeted geographic areas, task for the volunteers to do (e.g., vote for a new park location), incentive definitions, rules to dynamically adjust incentives, and success metrics or measurement metrics.

Activity Announcement or Launch may include generating activity Web page and automatically pushing announcement to social media channels.

Activity Recruitment (online) enables citizens to register as activity participants and activity participants to update recruitment status; enable citizens to register as volunteers and perform the task they are recruited for right there where they are registered; enable businesses (organizations or citizens) to register as sponsors; display activity recruitment status for social approval.

Activity Reporting and Analysis may provide aggregate display of activity progress of near real-time activity status for general public consumption and for use by the activity administrators: e.g., viewed, liked, followed, response rate, most followed people, temporal stats and advanced analytics for worker consumption, which enables near real-time monitoring of the progress of the activity status and adjustments of incentive based on the response rate and coverage.

Sensor-based refers to using various sensing devices, e.g., Pulse oxy meter, Heart beat monitor, Blood sugar monitor, Pedometer, etc., for determining information.

Sensor-based Assistant (PA) Capability refers to using various sensing devices to create individualized experience and assistance in various aspects related to an activity, e.g., sending, monitoring and tracking of individual progress daily toward the individual goals set by the users, and sending out reminders and alerts based on the goals set out by the users.

Various city/citizen initiated activities may be carried through communication/interaction channels such as community center activities, city infrastructure reporting via phones, public hearing processes, and so forth. Examples of activities include trying to persuade a group (a large number) of people to engage in a goal: e.g., 1) commit to ride their bike to work on a given week, 2) install rain gardens in their yard, 3) replace their incandescent light bulbs with CFLS (compact florescent light bulbs), 4) help recruit volunteers for a study. For city and citizens, the lack of a common single point interaction interface poses various challenges such as low participation rate, no visibility of activities to city administrators, inefficient city resource allocation/utilization, and so forth. Activities share common characteristics, and the process may be repeatable. They can be clearly defined with goals, a start and stop time, and activities to be done. Because activities happen at particular time (and sometimes place) they can be a social activity with people working together and getting friends involved. Because activities involve many people doing the same thing during the same time, they can use social incentives like leader boards, badges, rankings and points. Businesses may wish to sponsor them by contributing material incentives like coupons or t-shirts (and particular activities will attract particular sorts of people that particular businesses may be interested in). Participants can help one another by providing moral support, tips, etc. Activities are also well suited for test deployments in cities. One city may promote rain garden installation; another might promote bus use. Doing 1 or 2 activities is less of a commitment than, say, starting up an online 3ii. 3ii provides functions similar to 311, which is New York City's main source of government information and non-emergency services. There are specific roles in the City (usually the Communications Director) with whom to work.

Wellness specific problems for citizen engagement currently lack individual assistant capability (PA) and a system that communicates with PA. A methodology of the present disclosure may provide such PA capability in the citizen engagement conducted by the cities to do automate sensing using wireless sensors/GPS, categorization, self-learning, and automated correction of the categorization of commonly performed physical activities, e.g., running, jogging, driving, walking, etc., individualized monitoring and tracking of the sensed data (e.g., via various wireless sensors, e.g., Pulse oxy meter, Heart, beat monitor, Blood sugar monitor, Pedometer), monitoring and tracking of daily individual progress, (e.g., frequency and amount of eating, physical exercises, and increase/decrease of weight), and sending out reminders and alerts based on the goals created by the citizen to do the activities to improve the wellness of the citizens.

A methodology of the present disclosure in one embodiment may store, combine, correlate, and analyze public and non-public data about citizens, city infrastructure, and city and/or citizen initiated engagements and/or activities and their interactions to achieve an effective citizen engagement. The methodology in one embodiment may employ analytics to achieve the effectiveness of a citizen engagement. For example, for a given activity, an engagement model and analytics may quantify trust level of participants, impact assessment, individualized reward characterization, recruitment framework, behavior characterization, and prioritization of activities. In another aspect, an end-to-end Effective Citizen Engagement system may be provided that comprises 1) a back-end system that processes data from Web sites and social media, mobile phones, and sensing devices and produces analytics to achieve an effective citizen engagement, 2) End-user interface comprising one or more smartphone Apps (applications) for automated sensing of individual micro activities and for logging, viewing, and editing physical activities, diet and weight, as well as setting goals and working in teams, and one or more Web applications for users to interact with the system.

While the present disclosure describes a methodology with reference to a city and citizens of the city, it should be understood that the methodology of the present disclosure may be applicable to any other governing or organizational group and its constituents.

FIG. 1 illustrates in one embodiment a system design overview for providing an end-to-end effective citizen engagement. A technical approach in one embodiment combines public and non-public data from city and citizen data sources, use information integration and analytics to provide value, and deliver value via alerts to city (based on citizen data) and to citizens (based on other citizen data and city data). Such approach may also use behavior models as a component of functionality for validating citizen input and incentivizing citizen behavior so as to enable understanding of what is happening in the city and provide means of influencing city level outcomes.

There are various attributes of an individual that may be captured. Each attribute can play a role in determining an individual's engagement characteristics and qualifications. For example, a sustainability activity may be better for those who are more environmentally aware. A public hearing about transit planning would interest more people who use the public transit system who are being impacted by the transit planning. Each engagement may have an impact on a diverse set of key attributes of a citizen, e.g., environmental awareness, physical health conditions, geospatial existence, social relation, financial conditions, demographic attributes. A deep analytical capability may be provided in one embodiment of the present disclosure that quantifies each attribute. The actual data collected for these set of selected attributes for each activity constitute one of the data sources as shown in FIG. 1 and labeled as 'Multi-silo data' of the EECEASPA focus area.

Figure 2:
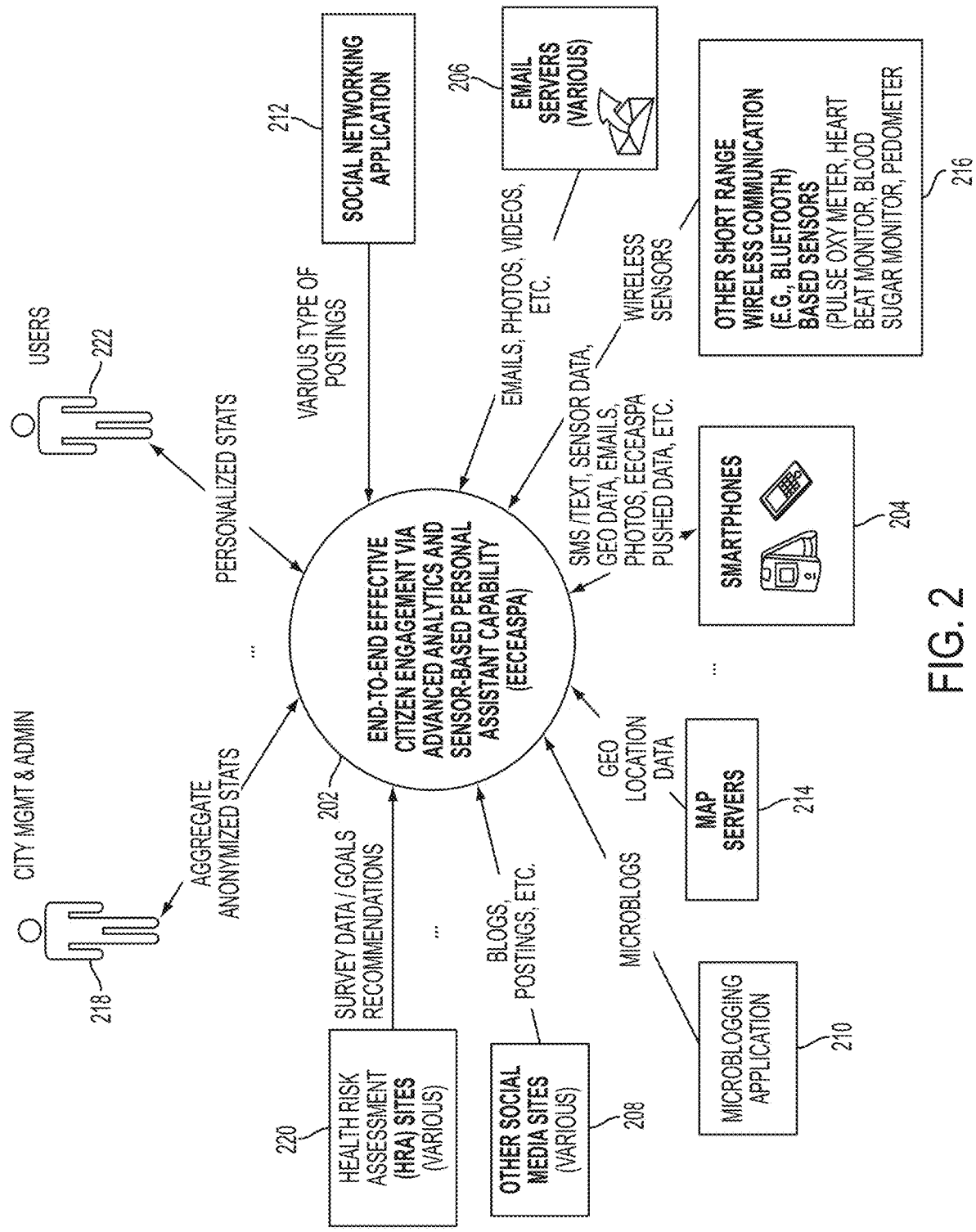
FIG. 2 illustrates system context in one embodiment of the present disclosure.

FIG. 2 illustrates a system context of End-to-end Effective Citizen Engagement via Advanced Analytics and Sensor-based Assistant Capability (EECEASPA) in one embodiment of the present disclosure. The system and methodologies thereof, in one aspect, enable effective end-to-end citizen engagements by providing sensing, monitoring, tracking, reminding, alerting, teaming, and individualized assistant capability. In one embodiment, EECEASPA 202 takes input from various data sources, e.g., smartphone Apps (GPS, user inputs) 204, map servers (geo location data) 214, aggregate anonymous participant statistics 218, participants' individual data 222, Survey data/goals recommendations from Health Risk Assessment (HRA) Sites 220, Emails, photos, videos from communication channels 206, and social computing channels (social media channels 208, e.g., social networking sites 212, blogging sites, microblogging sites 210). EECEASPA 202 may receive data such as text messages, sensor data, geographic location data, emails, photos, etc., from a mobile device such as smartphones 204 via an application (EECEASPA front end application) installed and running on the smartphones 204. The smartphones 204 (via the application) may also receive data pushed from the EECEASPA 202. EECEASPA 202 may also receive sensor data, e.g., wirelessly from sensor devices 216 that have wireless capabilities. Examples of sensor data may include data from pulse oxy meter, heart beat monitor, blood sugar monitor, pedometer, and others. Sensor data may also include data from automated sensing of the commonly performed human daily micro activities, e.g., jogging, jumping, running, driving, using sensing devices. Such sensor data may be also received from smartphones 204 that have such capabilities for sensing. User-assisted learning may be performed based on user-edited entries to self-correct and reclassify system logged activities to improve accuracy; to automatically detect patterns of misclassification, and automatically correct misclassification. In one aspect, sensor-based individual assistant capability may be provided that employ sensing devices and information assistant device for individualized sensing of everyday activities, e.g., individualized statistics collecting, monitoring, goal-tracking, displaying physical activities history, editing/adding physical activities, progress-displaying, reminding, alerting, and providing recommendations when interfacing with HRA sites, etc, teaming support to create, update, delete, join, and leave a team, as well as comparing anonymous aggregate data of other members in a team. Capabilities for monitoring, tracking, goal-setting, teaming, and integration with the HRA 220, and alerts may be provided based on data collected to support HRA improvement. Users (participants) 220 and/or city management/administration 218 may interact with EECEASPA 202 for engagements. EECEASPA may be implemented on one or more computer processors, e.g., as software running on the one or more processors.

Figure 3:
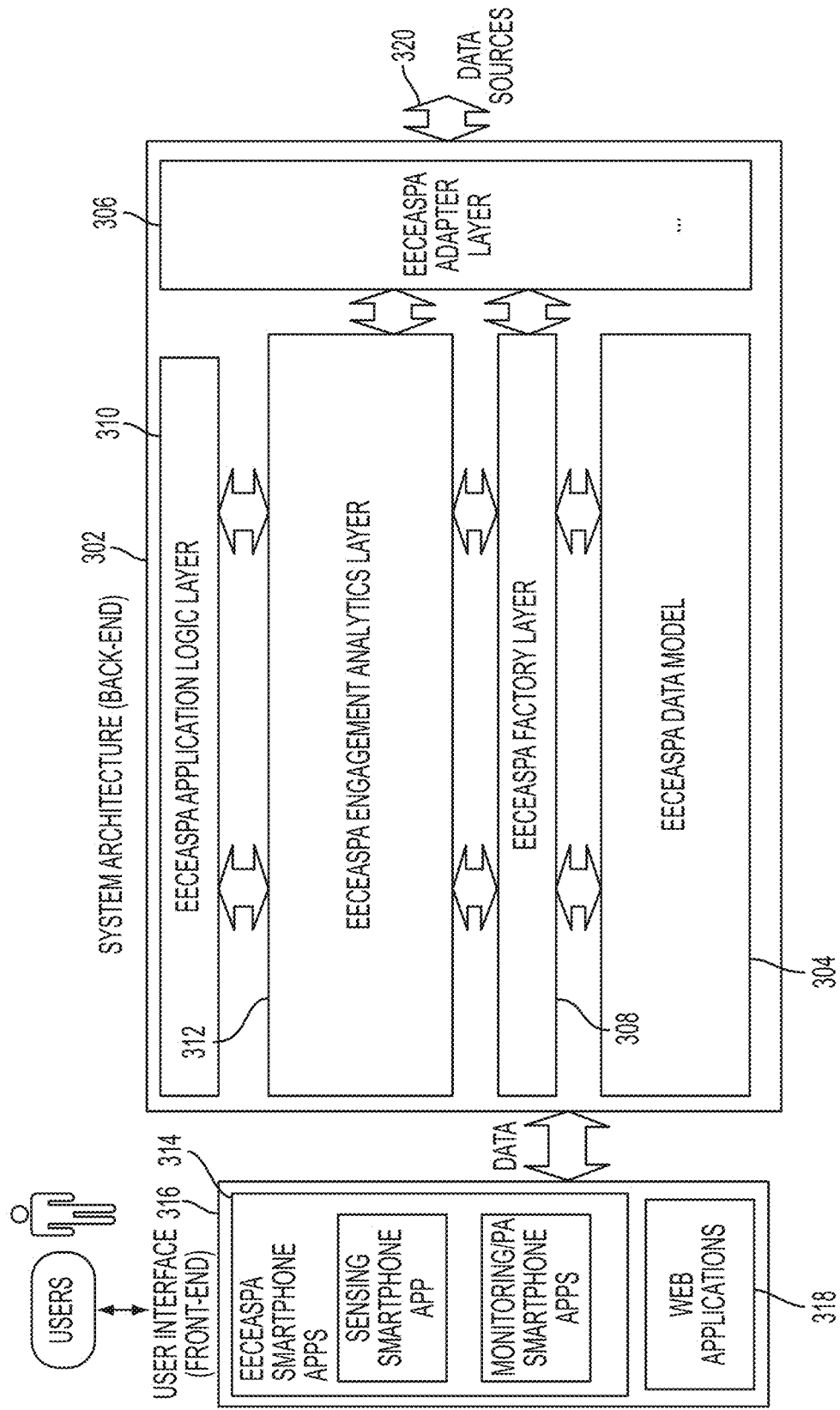
FIG. 3 is a diagram illustrating system components of End-to-end Effective Citizen Engagement via Advanced Analytics and Sensor-based Assistant Capability (EECEASPA) in one embodiment of the present disclosure.

FIG. 3 is a diagram illustrating system components of End-to-end Effective Citizen Engagement via Advanced Analytics and Sensor-based Assistant Capability (EECEASPA) in one embodiment of the present disclosure. System architecture 302, for example, shows back-end computer or computing components for implementing EECEASPA of the present disclosure in one embodiment. A Data model and a database 304 may comprise a set of data types and a database that stores and retrieves data as defined by the data model.

An Adapter layer 306 comprises one or more adapters for getting data from various communication and social computing channels for the said architecture 302 of citizen engagements. The Adapter layer 306, for example, may include application programming interfaces (API) or the like for interface with various data sources from receive and/or exchange data from the various data sources. There may be an API for each specific data source. Each adapter may process a specific set of data, for example, an HRA adapter may process health and/or wellness related data, e.g., weight, diet, and activities/exercise; a transit adapter may process smartphone GPS data of participant's movement records in and out of the City, a driver adapter may process driving data, e.g., driving habits; a sustainability adapter may process sustainability related data, e.g., water and energy smart meter data. Other adapters may be included, and more examples are described below.

A Factory layer 308 provides data management and integration, and application programming interfaces (APIs) for an effective mechanism to consume data from multiple the disintegrated data sources from various the communication and social media channels, transform the data through adaptation, extraction, inference, reduction, augmentation, and integration. The Factory layer 308 may retrieve data from the database (DB) 304. The Factory layer 308 supports the architecture 302 for citizen engagement and process, orchestrate to integrate with the data model 304, adapters 306, analytics and application logic 310. For cross-domain data integration, the factory layer links multiple disintegrated data sources by both dynamic integration at runtime and pre-calculated integration that stores data into database (DB).

An Engagement Analytics layer 312 comprises one or more analytics for analyzing the data and computing results of the citizen engagements. Examples of analytics are further described below.

An Application Logic layer 310 comprises one or more application logic tailored for various application types. An application logic of the Application Logic layer 310 may provide an application related functions that support one specific type of application. For example, the sustainability related application logic for water may provide functions to support a sustainability application and/or Web portal for water; application logic for electricity may provide functions to support a sustainability application and/or Web portal for electricity. Similarly, there may be application logic for health and/or wellness supporting a smart phone Application for health and/or wellness. Each application logic may implement the functions that support one type of application.

A front-end user interface 316 may comprise smartphone apps 314 for automated sensing of human micro activities and sensor-based individual assistant capability sense devices to act like a per individual assistant for individualized sensing. The front-end 316 of the system architecture may also comprise Web Applications 318, Apps for citizens and City (e.g., shown in FIGS. 2 at 218 and 222) to conduct effective citizen engagements. Web Applications 318 are applications that are Web based or accessible via Internet.

In one embodiment, EECEASPA takes input from various data sources 320, e.g., smartphone Apps (GPS, user inputs), individualized data, surveys, reports, communication channels (email, etc.), and social computing channels (social media channels, e.g., social networking sites, blogging sites, microblogging sites), e.g., as described with reference to FIG. 2.

In one embodiment, input data 320 are first processed by the Adapter layer 306. The Factory layer 308 integrates the data processed by the Adapter layer 306 and transforms the data into the correct format for the Engagement Analytics Layer 312 to perform calculation and produce results, which is used by a specific Application logic 310 targeted for a specific type of application to send and/or receive data via APIs to that target application (e.g., shown at 528 in FIG. 5). Examples of the calculations performed by the engagement analytics layer may include (but are not limited to): trust analytics that provides a mechanism for systematic analysis on the quality of data and/or inputs provided by activity participants, which can compromise the quality and/or effectiveness of the activities, incentive analytics that provides a mechanism to optimize the allocation of incentives resources and provide dynamic adjustment of incentive allocation based on a participant's individual incentive sensitivity to the changes of incentive amount, e.g., how a participant is responding to the incentive changes, and other analytics. Additional calculations may include impact analytics that analyzes the impact on the participants by the activity, behavior analytics that analyzes how the participants' behavior affects by the activity, reward analytics, recruitment analytics, geo analytics, effectiveness analytics and prioritization analytics, etc.

Table 1 illustrates some of the analytics by definition and examples of corresponding use cases:

| Analytics | Definition | Examples of Use Cases |
| --- | --- | --- |
| Reputation analytics | Assign a reputation metric to citizens for use to identify the quality of submission, detect unsolicited messaging, find domain experts, prioritize inputs, and as input to incentive analytics, etc. | Identify the quality of reports by participants Detect unsolicited messaging users; Find domain experts in some specific problem areas Help prioritize inputs from a good quality report source Use this metric for the incentive analytics to give rewards for more valuable inputs |
| Impact analytics | Based on pre-defined rules, link reported incidents and comments to impacted parties, actions, and possible outcomes | When a serious pothole report (e.g., through 3ii) is submitted, the impact analytics generates a list of actions to be taken by different departments, analyzes resources to be assigned, and creates a set of messages to be sent to each department |
| Incentive analytics | Generate various incentives such as points, badges, ranks, and so forth that are linked to reporting, polling, and other activities through a citizen engagement platform | 3ii: Give higher points to users with fast and valuable reports to have high impact Investment: give higher points to users with valuable comments that help shape the public hearing process |
| Recruitment framework and analytics | For a given task (e.g., dispatching a routine patrol to a community), select the right set of people to perform the task Based on definable rules, identify best workers for a reported incident | For a electric pole repair request, the analytics searches for available workers and ranks them in preferred order so decision makers can choose the right one |
| Social interaction analytics | Perform various analytics over the social primitives such as identifying influential users, identifying social groups based on interaction dynamics | Use to prioritize actions to inputs from influential citizens Improve the ability to detect early indication of incident that needs immediate attention |
| Poll analytics | Aggregate and summarize inputs from poll participants | For a simple poll such as 'community walkability' (1 to 5 wherein 1 represents the least and 5 represents the most), generate a walkability map showing statistics Soliciting comments, count a number of positive words and negative words and show statistics |

Smartphone apps 314 provide various functions, for example, comprising: 1) automated sensing, classification, self-correction and learning of human micro mobility activities to produce accurate classification of the type and duration of an activity, 2) monitoring, tracking, goal-setting, teaming, and integration with the health risk assessment (HRA) sites, provide alerts based on data collected to support HRA improvement, etc. In one embodiment of the present disclosure, there may be more than one smartphone app. For instance, one app may contain two sets of functions. In this example implementation, one set of functions is implemented by one app. Smartphone apps 314 may be a CEP App described above.

Both Smartphone Apps (for Automated sensing and Individual Assistant monitoring) may be downloaded and installed on a participant's smartphone with an operating system, e.g., Android™ OS, and/or others. Users take their smartphones with them for physical activities, e.g., walking or running. Smartphone App for Automated sensing (e.g., at 314) utilizes the sensing device, e.g., Smartphone accelerometer, to provide automated sensing of the most commonly performed human daily micro activities, e.g., jogging, jumping, running, driving, etc. The App transmits the data produced by the use of the sensing device to the backend server, which performs analytics on the data for certain duration and automatically classifies the data. It can also perform user-assisted learning based on user-edited entries to self-correct and reclassify system logged activities to improve accuracy; automatic detection of patterns of misclassification; and automatic correction of misclassification. Smartphone App for Individual Assistant monitoring, tracking, goal-setting (e.g., at 314) may provide for individualized statistics collecting, monitoring, goal-tracking, displaying physical activities history, editing/adding physical activities, progress-displaying, reminding, alerting, and providing recommendations when interfacing with HRA sites, etc. Smartphone App for Individual Assistant monitoring, tracking, goal-setting (e.g., at 314) may also provide for teaming support to create, update, delete, join, and leave a team, as well as compare anonymous aggregate data of other members in a team. Smartphone App for Individual Assistant monitoring, tracking, goal-setting (e.g., at 314) may also provide for integration with the HRA, and the alerts based on data collected to support HRA improvement.

A user interface 316 (e.g., smartphone apps), Web Applications 318, and Apps 314 interact with citizens and City management to enable effective citizen engagements between City and its citizens.

Figure 4:
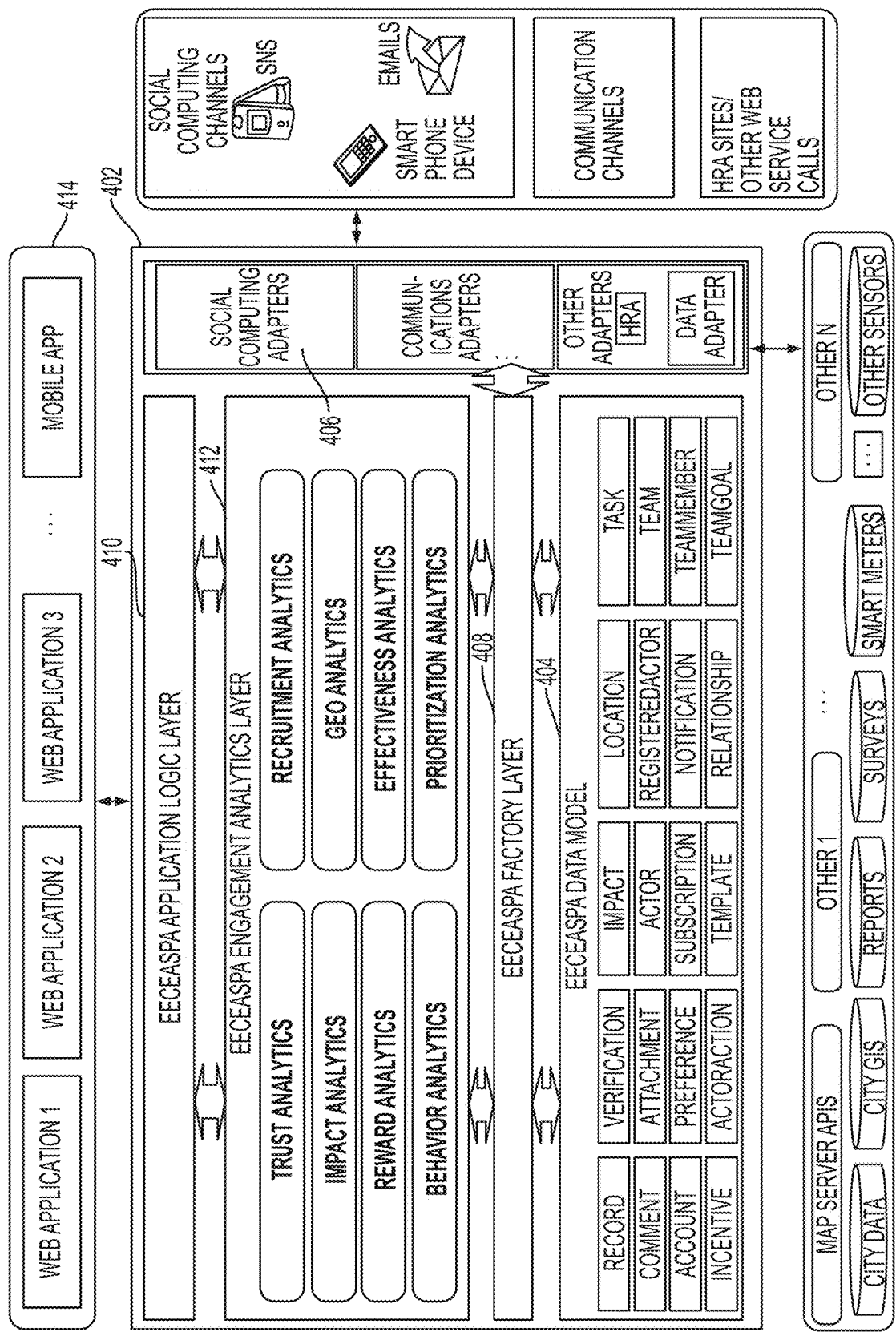
FIG. 4 illustrates system architecture in one embodiment of the present disclosure.

FIG. 4 illustrates system architecture in one embodiment of the present disclosure, for example, shown at 302 in FIG. 3. The architecture 402 for the back-end system in one embodiment comprises a Data model 404, an Adapter layer 406, a Factory layer 408 for Data management/integration and process orchestration, an Engagement Analytics layer 412, and an Application logic layer 410. The Data model 404 may comprise a various data types such as (but not limited to): Record, Verification, Impact, Location, Actor, RegisteredActor, Comment, Attachment, Account, Preference, Subscription, Notification, Incentive, ActorAction, Template, Relationship, Task, Team, Teammember, and Teamgoal. The Data model 404 may include other data types, and a database that stores and retrieves data stored according to the data model.

The Adapter layer 406 may comprise one or more adapters, for example, Social computing or media adapters/APIs, Communication adapters/APIs, and/or Other adapters/APIs, e.g. adapters to interface with a monitoring and tracking platform, e.g., intelligent operations center and adapter for Health Risk Assessment (HRA) sites, etc. The HRA adapter is used to interface with a third party system that provides auxiliary information, e.g., a health risk assessment survey.

The Factory layer 408 that provides data management and integration, and process orchestration, may comprise the following capabilities: Integration with the Data model 404; integration with the Social computing adapters/APIs; integration with various adapter 406, e.g., integration with the Communication adapters/APIs, integration with the monitoring and tracking platform for key performance indicators (KPIs) computation and display; backend processing for multiple sensor-based smartphone apps.

Generally, the Factory layer 408 may perform following functions: Adaptation; Extracting, inferring, reducing, and augmenting; and integration.

Adaptation may include importing and/or transforming the source data to the format required by each target data source consumer, e.g., analytics layer (e.g., trust, incentive, impact analytics, etc.), application logic, applications, and/or others.

Extracting, inferring, reducing, and augmenting may include extracting specific data elements required for the output, and inferring based on the extracted data to produce additional data required by the output (e.g., what was happening at certain time). For example, the location stamp of a social media photo, textual input of store name may be extracted, then the approximate location, e.g., restaurant, may be determined to look up the location identification (e.g., lat/long) and prior location information may be combined. Timestamp of postings and global positioning system (GPS) locations may be used to infer information. For example, rough location can infer what one might be doing or interested in, e.g., park or such outdoor activities, home improvement, restaurant. Such information may be used in marketing and promotional offerings applications. As another example, this function may integrate multiple and different types of data into an integrated data item.

Integration may include cross-domain data integration, e.g., a way to link multiple disintegrated data sources, e.g., sensing data is linked to multi-domain data, e.g., water, energy, wellness, social network identifier, social network email, public wall. For example, a sensing app may log location information about a user and a social network site may have location data from the same user. Combining both data may fill in a gap and provide more complete information.

The integrating and process orchestration of the Factory layer may comprise integrating with a monitoring and tracking portal, e.g., IBM Intelligent Operations Center for computation and display of the important statistics, e.g. key performance indicators (KPIs), integration with the social computing adapters, integration with the communication adapters, integration with other adapters, e.g., for Health Risk Assessment (HRA) sites, which is a third party system that provides auxiliary information, e.g., a health risk assessment survey, as well as integration with backend processing for data received from multiple sensor-based smartphone apps.

The Engagement Analytics layer 412 further comprises analytics and Application Programming Interfaces (APIs) for Trust analytics, Impact analytics, Reward analytics, Behavior analytics, Recruitment analytics, Geo analytics, Effectiveness analytics and Prioritization analytics. The Application Logic layer 410 interfaces with the analytics APIs and is tailored for a specific type of application 414.

A user interface, Web Applications, and Apps (e.g., 414) interact with the backend system 402 to enable citizens and city management to conduct effective citizen engagements. An example of 'a type of application' 414 may include sustainability applications, e.g., for water and electricity. Such sustainability applications provide residents and businesses with information (of a history of their consumption) and insights and/or recommendations (of their usage patterns, trend, forecast of usage and/or ways and activities to reduce consumption) through technology and analytics and enable them to, e.g., conserve water and electricity consumption, save bills on utilities, and improve the environment, and others. The behavior analytics can assess how information and technology affect the behavior of the users, e.g., whether or not users actually changed their behavior to conserve water and/or electricity while using the sustainability application, and if yes, and what was the actual savings.

Figure 5:
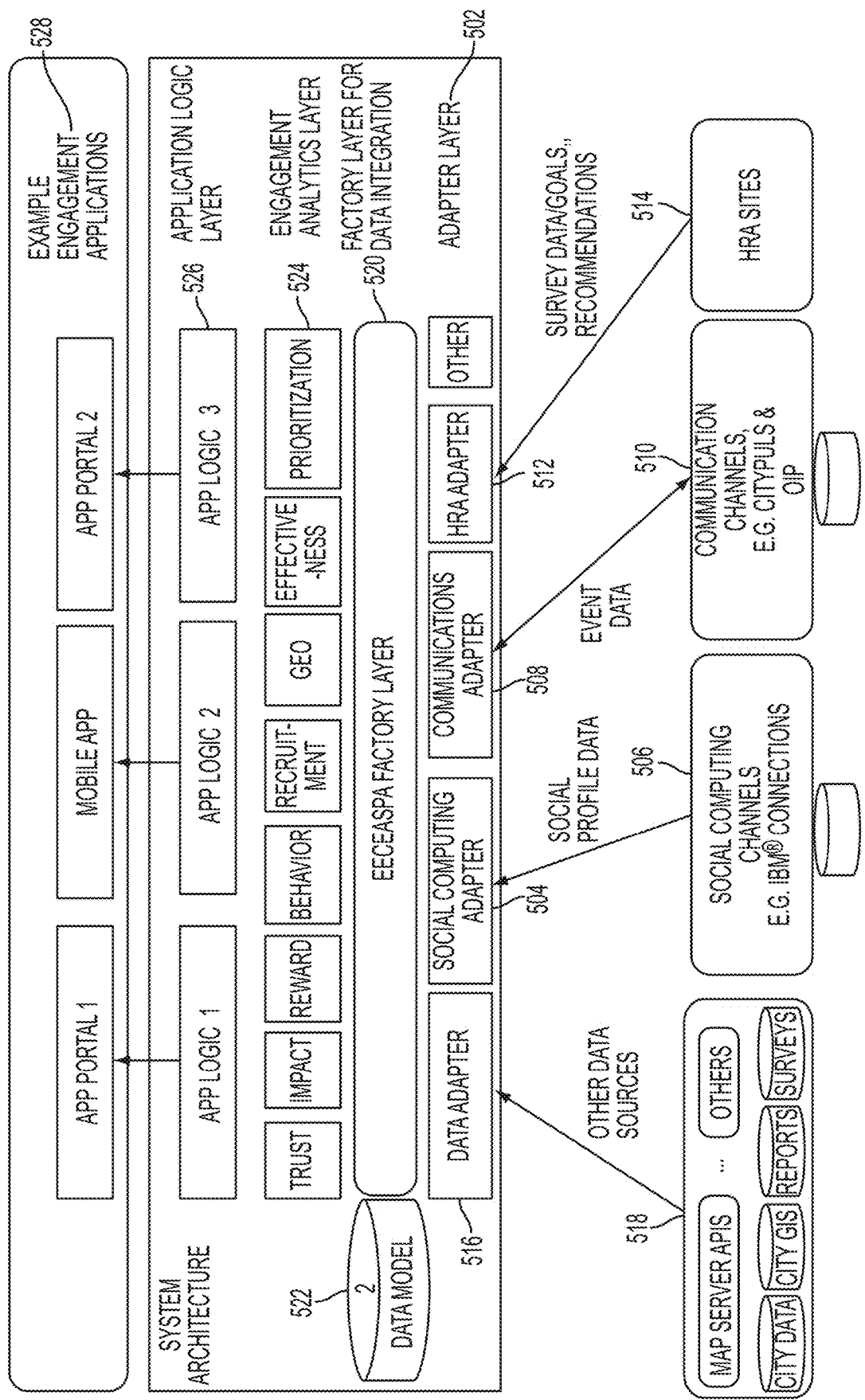
FIG. 5 is a diagram illustrating an example data flow in one embodiment of the present disclosure.

FIG. 5 is a diagram illustrating an example data flow in one embodiment of the present disclosure. The Adapter layer 502 comprising APIs or the like interfaces to data sources may receive data from data sources. For example, a social computing adapter 504 or API or the like may receive social data from social computing channels 506. Communications adapter 508 or API or the like may receive from and send to communication channels 510, event data. HRA adapter 512 or the like may receive survey data, goals, and recommendations from HRA sites 514. One or more other data adapters (e.g., 516) or the like may interface to other data sources 518 for receiving and/or sending data to those sources.

The Factory layer 520 integrates the data obtained via the adapter layer 502 into the data model 522. For example, various data from the various data sources are extracted and formatted into the appropriate format and stored as attributes (values) of the data model. That is, the Factory layer 520 provides data management, integration, process orchestration and integrates with the rest of the components, e.g., data model, social computing adapters and/or APIs, communication adapters and/or APIs, monitoring and tracking portal for computation and display of the key performance indicators (KPIs), and backend processing for multiple sensor-based smartphone apps.

The Engagement Analytics layer 524 uses the data stored according to the structure of the data model to create appropriate analytics, e.g., Trust, Impact, Reward, Behavior, Recruitment, Geo, Effectiveness, and Prioritization.

The Application Logic layer 526 processes the results of the analytics performed in the Engagement layer 524, and provides the data to users, e.g., via user interface programs (e.g., application portals, mobile applications, etc.) 528. Application Logic layer 526 is further described with reference to the Application Logic at 310 in FIG. 3.

Thus, in one embodiment, a method for providing end-to-end citizen engagements, may comprise obtaining data, using a computer processor, from one or more of communication and social computing channels via one or more adapters. The obtaining of the data further may include receiving data from one or more sensing devices that sense one or more activities of one or more participants of the end-to-end citizen engagements. The obtaining of the data may further include communicating with a remote application installed on a mobile device to receive the data. The obtaining of the data may be performed by one or more adapters and application programming interfaces executing on the processor for communicating with at least the one or more of communication and social computing channels.

The method may also include providing data refactoring and management, integration and process orchestration, using the computer processor, of the data according to a data model as data attributes of the data model, the data obtained from multiple disintegrated data sources. The data model may specify a set of data types, which may include at least Record, Verification, Impact, Location, Actor, RegisteredActor, Comment, Attachment, Account, Preference, Subscription, Notification, Incentive, ActorAction, Template, Relationship, Team, Teammember, and Teamgoal data types.

The providing of data management and integration may further include performing adaptation, extraction, inference, reduction and augmentation, and integration of the multiple disintegrated data sources.

The integrating and process orchestration may further comprise integrating with a monitoring and tracking portal, e.g., for computation and display of the statistics, e.g., key performance indicators (KPIs) computation and display, integration with one or more social computing adapters, integration with one or more communication adapters, integration with other adapters, e.g., for Health Risk Assessment (HRA) sites, which is a third party system that provides auxiliary information, e.g., a health risk assessment survey, as well as integration with backend processing for multiple sensor-based smartphone apps.

The one or more analytics may be performed by invoking one or more application programming interfaces corresponding to the one or more analytics, the one or more application programming interfaces corresponding to one or more of Trust analytics, Impact analytics, Reward analytics, Behavior analytics, Recruitment analytics, Geo analytics, Effectiveness analytics and Prioritization analytics.

The method may also include performing, using the computer processor, one or more analytics based on the data attributes stored according to the data model and input specified to the one or more analytics.

The method may also include providing, using the computer processor, one or more results computed by performing the one or more analytics.

The method may further include producing, using the computer processor, one or more application logics supporting one or more front-end applications. One application logic may be custom-tailored for one application, e.g., desk-top application, Web-based applications and/or portals, smartphone applications, and the like.

The method may also include providing the one or more front-end applications for automated sensing of user activities and sensor-based individual assistant capability. The front-end applications may include one or more of Smartphone apps for automated sensing of user micro activities. Sensor-based Individual Assistant Capability may be provided employing sensing devices that function as a per individual assistant for individualized the sensing. The Smartphone apps further may include one or more functions, e.g., automated sensing, classification, self-correction and learning of human micro mobility activities to produce accurate classification of the type and duration of an activity, monitoring, tracking, goal-setting, teaming, providing alerts based on user's activity history, and optionally integrating with the HRA and providing alerts based on data collected to support HRA improvement, etc.

Figure 6:
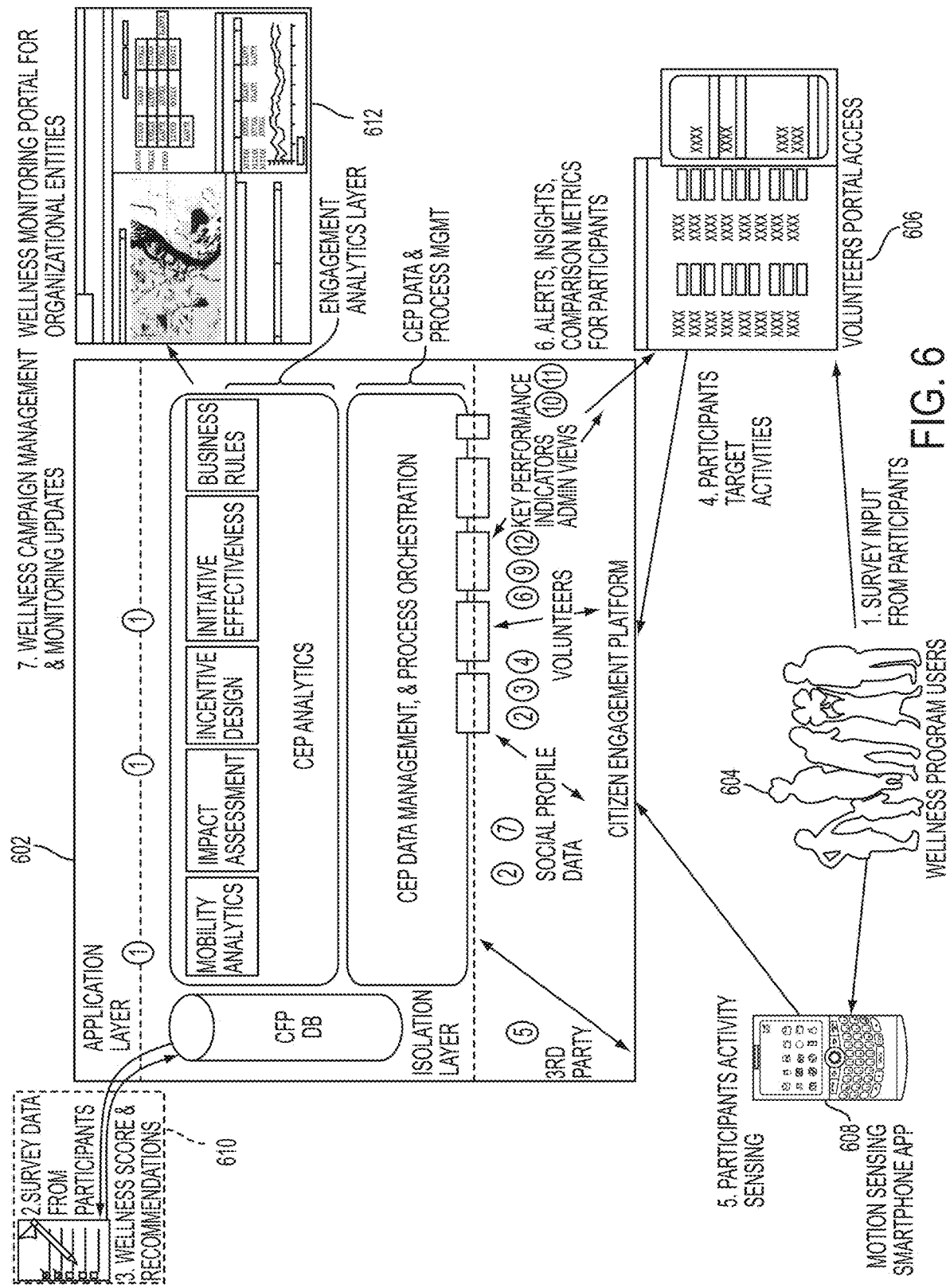
FIG. 6 is a diagram illustrating a use case for wellness program using EECEASPA of the present disclosure in one embodiment, e.g., wellness monitoring and individualized incentive and tracking.

FIG. 6 is a diagram illustrating a use case for wellness program using EECEASPA of the present disclosure in one embodiment, e.g., wellness monitoring and individualized incentive and tracking. Citizen Engagement Platform (CEP) 602 of the present disclosure may receive data about user in various ways. CEP 602 comprises the back-end system architecture components and functionality shown in FIG. 4 in one embodiment of the present disclosure. For example, survey input may be received from participants 604 via a web portal or smart phone application 606 or the like. The Citizen Engagement Platform 602 may receive data from the web portal 606 and also may provide alerts, insights, comparison metrics for participants via the web portal 606. The Citizen Engagement Platform 602 also may receive data associated with participant activity sensing via motion sensing smartphone apps 608. Optionally, the Citizen Engagement Platform 602 also may also receive survey data from participants and wellness scores and recommendations for participants by interacting with certain (Health Risk Assessment) HRA sites, which processes the survey data from participants and provide wellness score and recommendations in return as shown at 610. If the wellness score and recommendations data were received by the Citizen Engagement Platform 602, it displays such data to users of the wellness portal/smartphone application. The Citizen Engagement Platform 602 may provide wellness activity management and monitoring updates to wellness monitoring portal for organizational entities 612.

Figure 7:
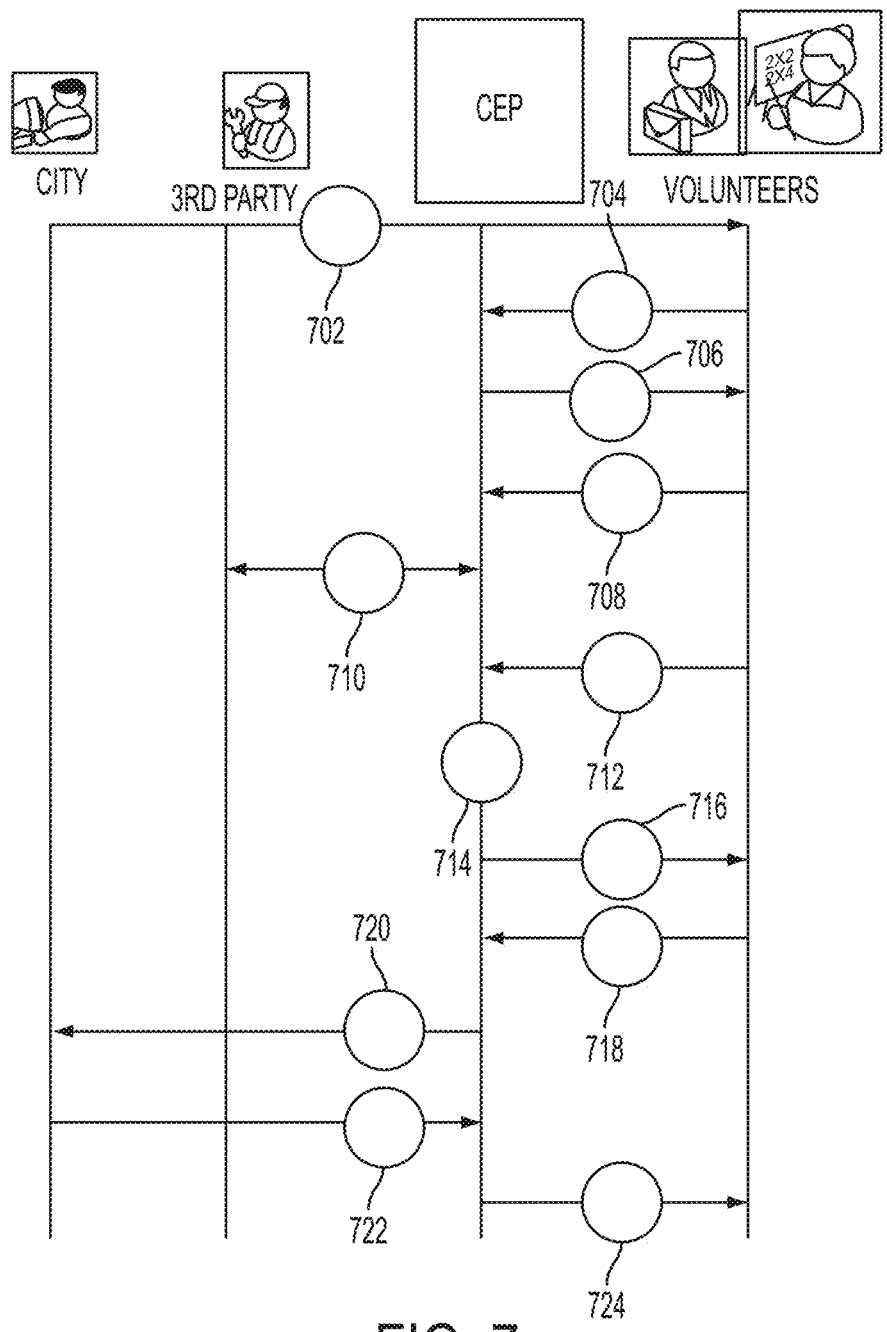
FIG. 7 shows an example flow that illustrates a use case for wellness programs using EECEASPA with HRA in one embodiment of the present disclosure.
Figure 13:
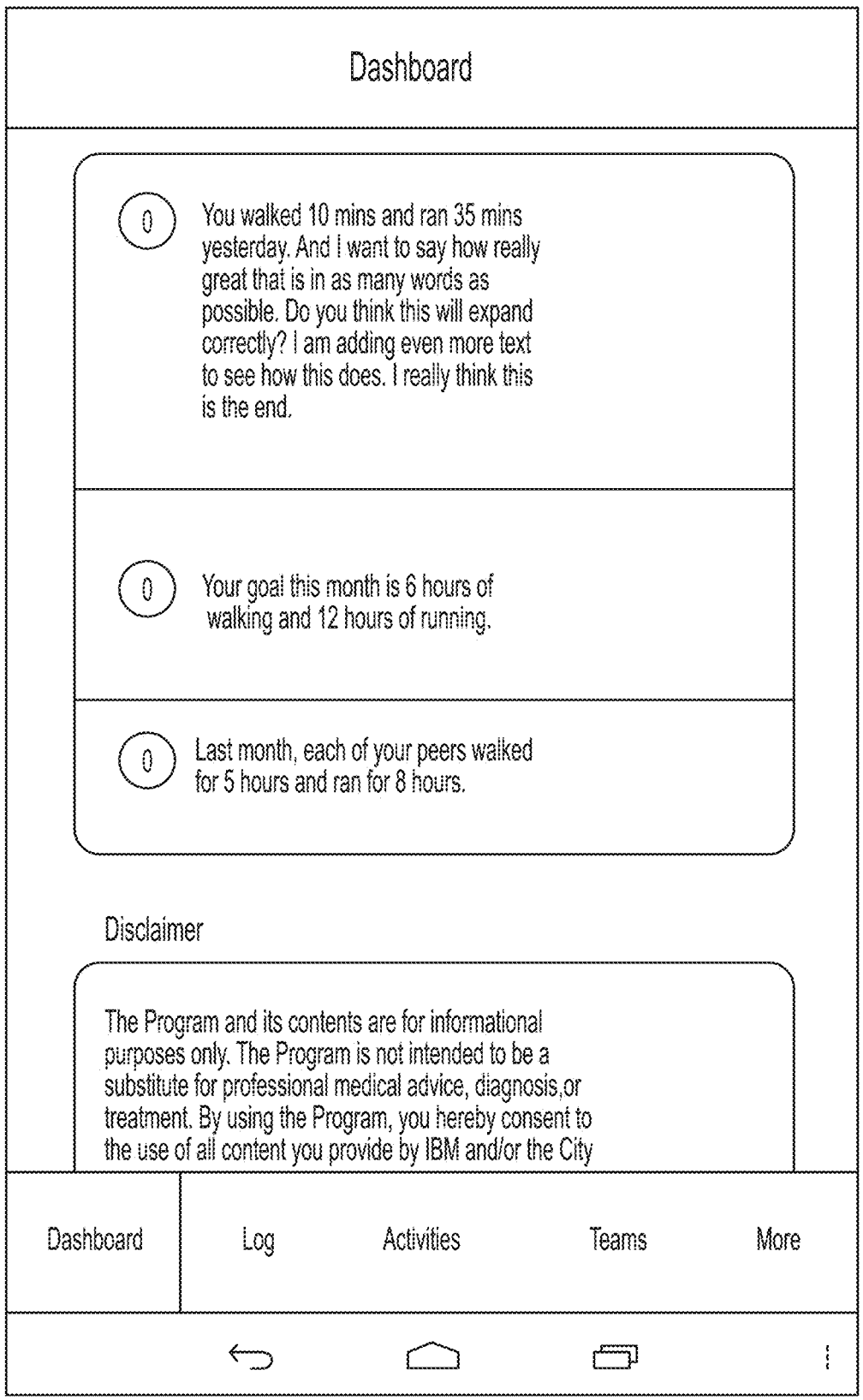

FIG. 7 shows a sample flow that illustrates a use case for wellness programs using EECEASPA with HRA in one embodiment of the present disclosure. This embodiment may utilize a third party HRA site 710. At 702, City recruits volunteers and launches CEP wellness program. At 704, volunteers log in and/or install smartphone application on their devices. They input information, for example, data associated with the volunteers (participants), which the CEP receives. At 706, CEP delivers HRA survey to the volunteers. At 708, enrolled citizens (also referred to as volunteers or participants) respond to HRA survey, which CEP receives. At 710, CEP exchanges the information about the survey with a third party to get HRA based metrics, e.g., health related scores and recommendations, which may be determined by each HRA site. Any such metrics relevant to the scenario at hand for health and/or wellness can be input to the Citizen Engagement Platform 602, which can in turn display the metrics to users. For example, if the program is for diabetes prevention, the health metrics would be related to diabetes. Similarly, if the program is for healthy weight or heart disease prevention, the metrics may be related to diet, weight and/or heart disease. At 712, volunteer mobility is sensed (e.g., by smartphone app that senses activities) and reported into CEP. For instance, CEP receives such data via its adapters. At 714, CEP analyzes mobility, HRA and all other inputs associated with each volunteer. For instance, CEP's engagement layer may perform the analysis. At 716, CEP shares information, insights and recommends actions and interventions with volunteers. FIG. 13 shows examples of the shared information and insights. At 718, volunteers engage in recommended activities and part of this is sensed and part of this is reported to CEP. At 720, CEP aggregates results and evaluates program effectiveness. At 722, City/program stakeholders understand engagement effectiveness. At 724, CEP thanks and rewards volunteers with incentive points, if any. In the example flow shown in FIG. 7, an HRA site may provide score and recommendations based on users' surveys. CEP may interact with the HRA site to retrieve those score and recommendations and display them to users.

Figure 8:
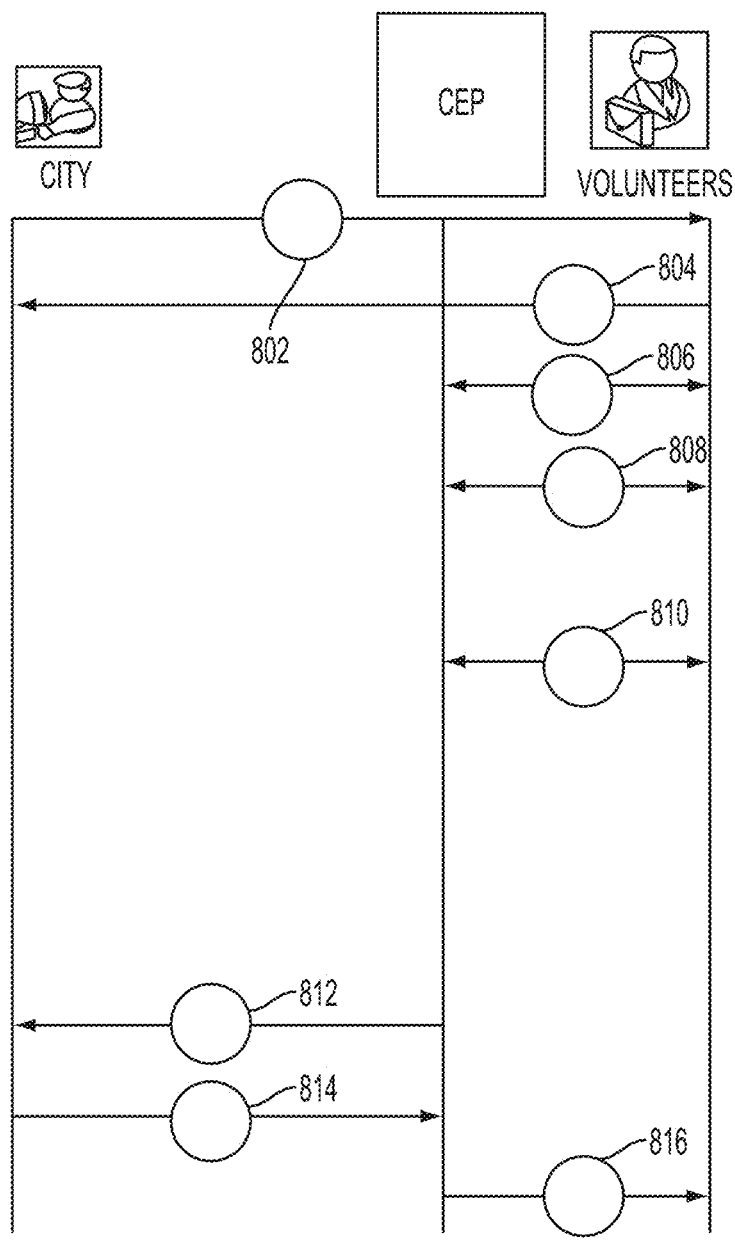
FIG. 8 shows an example flow that illustrates another use case for wellness programs using EECEASPA in one embodiment of the present disclosure.

FIG. 8 shows an example flow that illustrates another use case for wellness programs using EECEASPA in one embodiment of the present disclosure. At 802, City recruits volunteers and launches CEP wellness program. At 804, Volunteers log in and/or install smartphone application on their devices. At 806, volunteer mobility is sensed (e.g., by smartphone app that senses activities) and reported into CEP Application (App), e.g., a individual assistant app or the like. Volunteers can review, log, edit, add, and otherwise update their physical activity entries, diet and weight entries in the CEP App. At 808, volunteers set goals to track their own progress, e.g., monitoring and tracking of physical activities, diet, weight, and/or others, and receiving reminders from CEP App (e.g., the individual assistant app). At 810, a game that enables volunteer participants to compete by Team allows teaming support for volunteers to compare their own progress with aggregate data of anonymous others. Briefly, the teaming support enables volunteers to form a team with a certain goal, e.g., healthy weight, join team, and compete by team. At 812, CEP aggregates results and evaluates program effectiveness. CEP provides reports to the City of engagement progress. At 814, City/Program stakeholders understand engagement effectiveness. At 816, CEP thanks and rewards volunteers with incentive points, if any.

Figure 9:
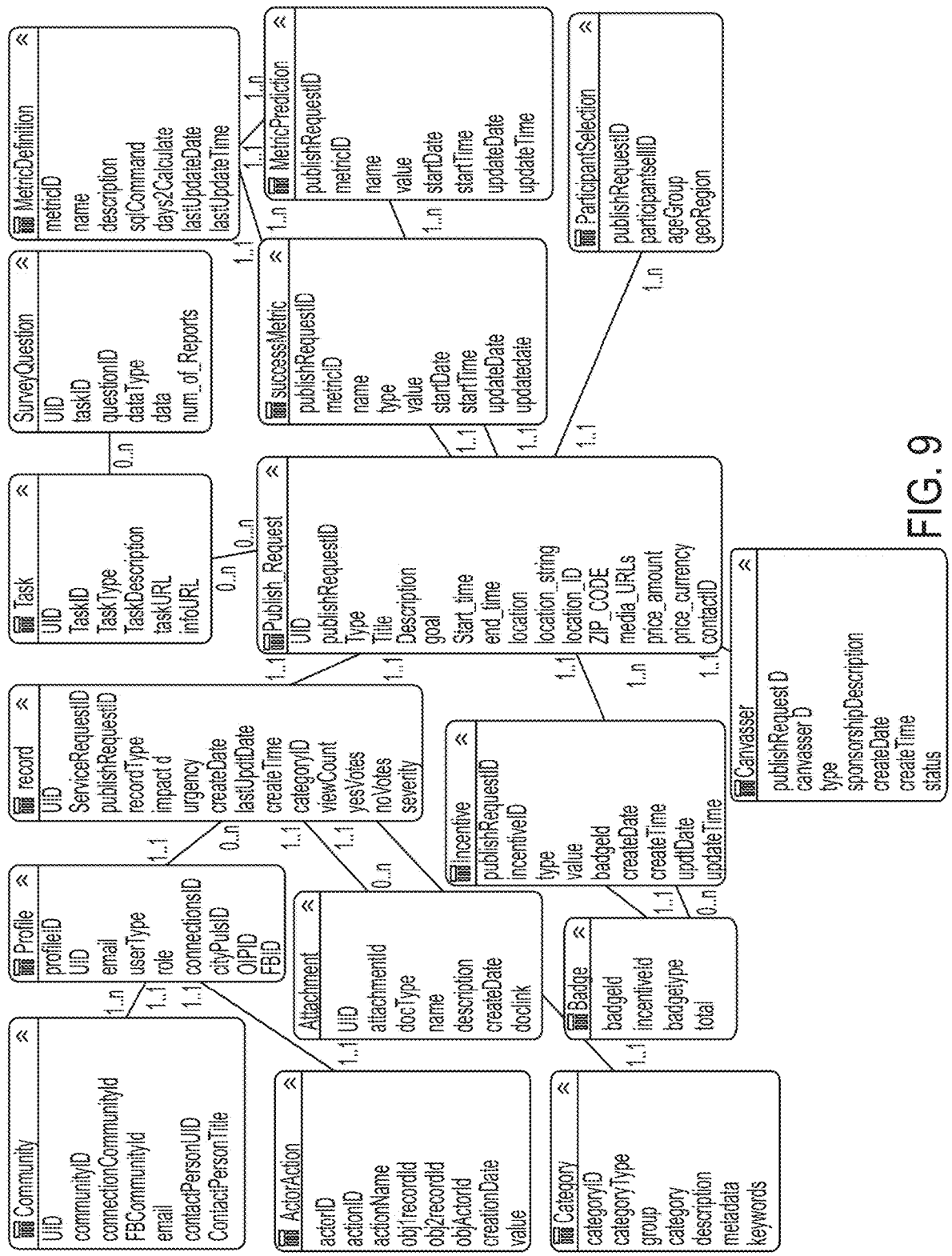
FIG. 9 and FIG. 10 illustrate a data model in one embodiment of the present disclosure.
Figure 10:
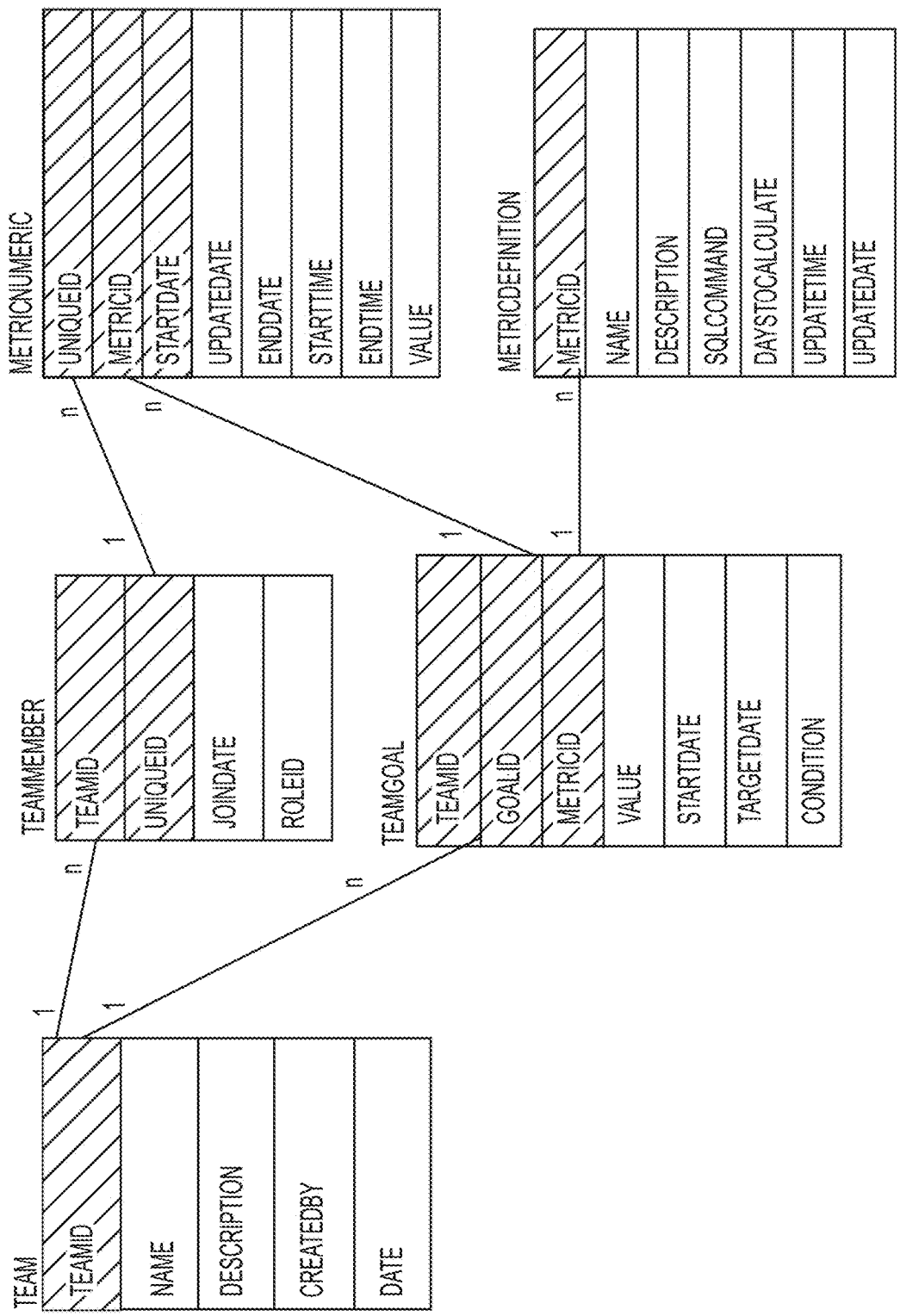

FIG. 9 and FIG. 10 illustrate a data model (e.g., shown in FIG. 3 at 304) in one embodiment of the present disclosure. The data model in one embodiment of the present disclosure may provide supports for various data (not an inclusive list): e.g. Record, Verification, Impact, Location, Actor, RegisteredActor, Comment, Attachment, Account, Preference, Subscription, Notification, Incentive, ActorAction, Template, Relationship, Team, Teammember, and Teamgoal, etc.

For example, the data model supports both registered users and anonymous users. Data types associated with this type of support may include: Actor (anonymous users), RegisteredActor (users or organizations known to Citizen Engagement Platform, and Account. Once a user/organization becomes a RegisteredActor that is known to the system, the user or organization can have Incentive record. Both registered users and anonymous users can receive notifications. Any Actor (anonymous or registered) can have Notification, Record (and related Incident, Announcement, i.e., proposal and investment), and ActorAction. The model may also support organizations and single users.

In addition, the data model may support at least three types based on one base data type (Record): Incident (i.e., Service Request), Announcement (for a proposal of a new initiative, e.g., clean air or sidewalk-pick on bulky furniture, etc., or an investment of a project, e.g., new building, highway, bus route, etc.). Record is anything that is reported by the citizen and can be located on a map. It contains commonly used data fields including various fields for impact, verification, location and revision. Data type associated with this type of support may include: Record, Incident, Announcement. Record has several related data types: CategoryItem, Impact, Verification, Comments, Revision, MergeRecord, Area (for location and neighborhood). Record also includes various data, e.g., urgency, severity, certainty. Announcement has several related data types: Contact, Attachment (can be: Results or Collection (e.g. files, images, videos, etc.)).

The data model of the present disclosure in one embodiment may also support the following data types: Notification, Impact, Verification, Area, ActorAction, Incentive, NotifyTemplate. Notification may involve several other data types: Preference, Subscription (start and stop times), Location, Route (for location-based notification). Verification may involve several other data types: VerifyRule. Both Impact and Verification may be used together to arrive at one final determination of the decision of an Incident in terms of the reliability of the source, the user's reputation (e.g., trust score computed by trust analytics), and the impact on users (via impact score computed by impact analytics that analyzes the impact on the city residents of certain reported incidents, e.g., potholes, power outage, chemical gas leak, etc.), etc. ActorAction is a general way to track all activities done by an actor, e.g., 'report' an incident, 'vote' a proposal, 'comment' on another actor's comment, 'view' portal page, etc. This can be used for analytics, e.g., more 'report' activities than 'viewing' activities. NotifyTemplate is an instance of the notification at a point in time for ease of reuse and customization. This also includes Preference, Subscription (start and stop times), Location, Route, etc. Users can reuse or change the templates without having to go through the trouble creating from scratch the entire list of data fields as described in the template. For example, organizations may want to create templates for its members. Also, one or more frequently used templates, e.g., member record, which may include commonly used list of data fields, e.g., member ID, name, address, phone numbers, job title, date hired, emergency contact info, etc.

FIG. 10 describes a data model comprising data types that support Team related functions, e.g., Team, Teammember, Teamgoal, and related the metrics for the team member and team goal. These data types enable users to participate in teams and compete by team. A user can create a team with a goal, join a team, and leave a team. Each team has a total score, which is a tally of the scores of all its members. There may be rules that govern the winning team, e.g., the team that has the highest score wins.

As described above, the data model is used to store the data received from various data sources and data used in the EECEASPA of the present disclosure, in a structured format for use by various functionalities of the EECEASPA.

Figure 11:
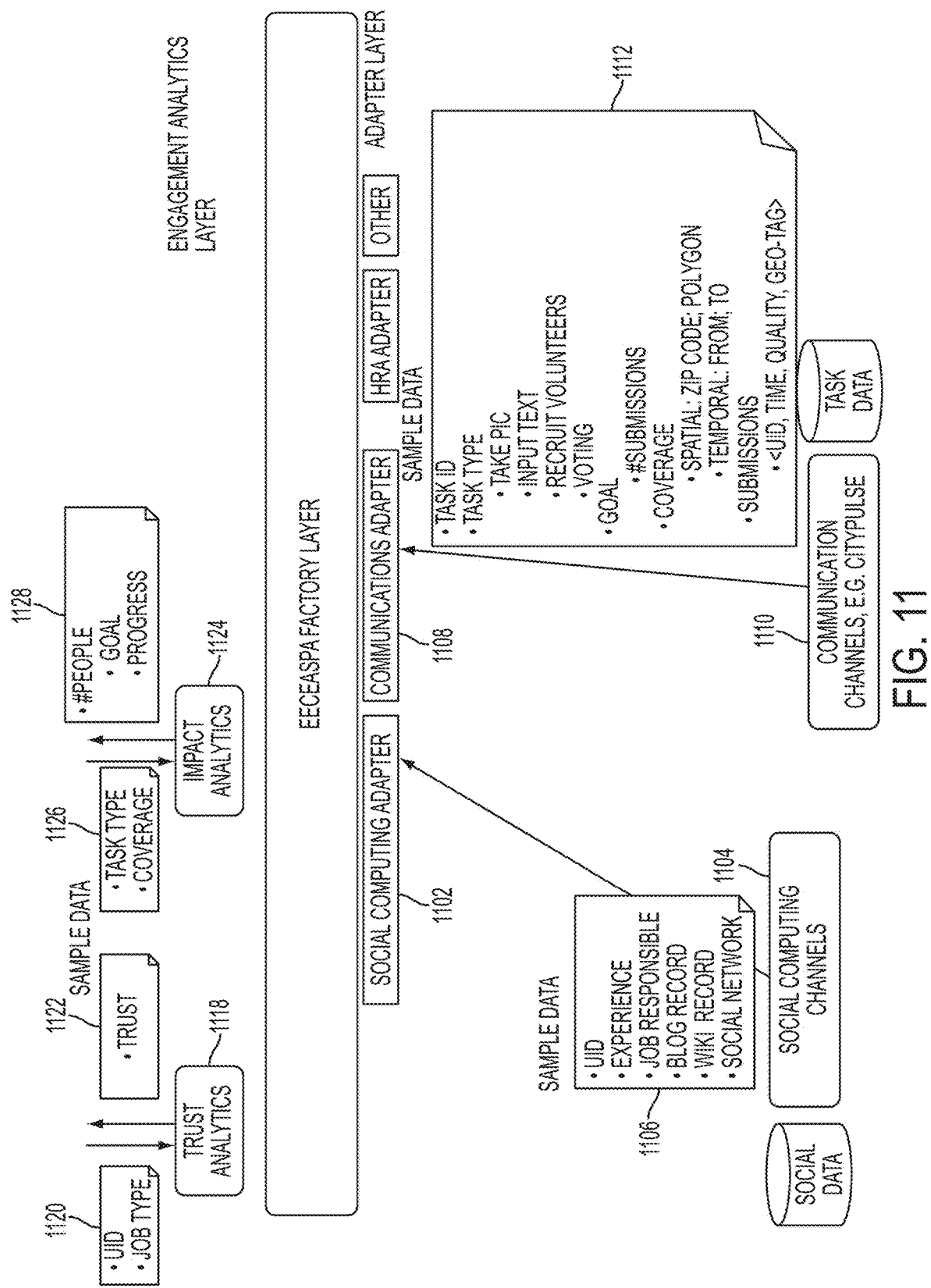
FIG. 11 shows an example data flow for performing trust and impact analytics in one embodiment of the present disclosure.

FIG. 11 shows an example data flow via the factory layer (e.g., shown in FIG. 3 at 308) for performing trust and impact analytics in one embodiment of the present disclosure. Social computing adapter 1102 receives data from one or more social computing channels 1104, which may have social data 1106 stored associated with the one or more social computing channels 1104. Sample data may include user ID (UID), Experience, Job responsible, Blog record, Wild record, Social network. Communications adapter 1108 receives from one or more communication channels 1110 data associated with tasks 1112 which the communication channel 1110 may store. Sample data may include Task ID, Task type (take pic, input text, recruit volunteers, voting), Goal (#submissions), Coverage (spatial: zip code, polygon; temporal: from, to), Submissions (UID, time, quality, geotag). The Factory layer takes the data received by the Adapter layer, transforms the data into appropriate data structure of the data model. Trust Analytics 1118 of the Engagement Analytics layer takes UID and Job type data 1120 as input, and performs computation. The resulting Trust value 1122 is provided to a user (e.g., via the application logic and front end application). Impact Analytics 1124 of the Engagement Analytics layer takes Task type and Coverage data 1126 as input, and performs computation to produce output 1128 that includes the number of people, goal and progress.

Figure 12:
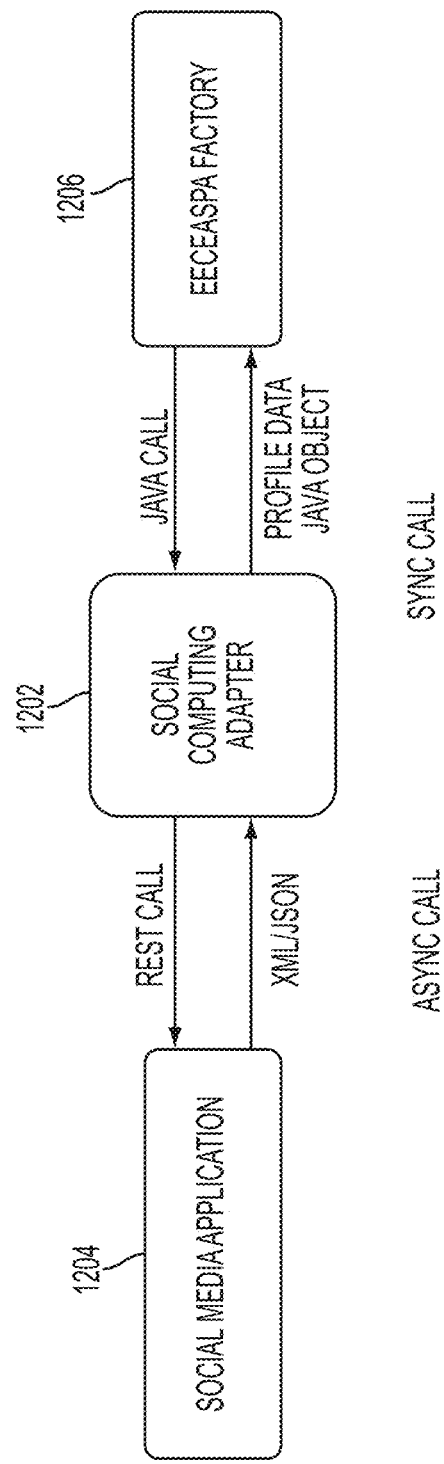
FIG. 12 illustrates software module interaction and APIs in EECEASPA factory layer in one embodiment of the present disclosure.

FIG. 12 illustrates software module interaction and APIs in EECEASPA factory layer in one embodiment of the present disclosure. An adapter layer (e.g., social computing adapter) 1202 may use a Representational State Transfer (REST) call to communicate with a data source (e.g., social media channel) 1204. The data source may communicate an Extensible Markup Language (XML) or JavaScript Object Notation (JSON) data to the adapter 1202. The communication between the adapter 1202 and the data source 1204 may be in asynchronous mode. The factory layer 1206 may use a Java™ call to communicate with the adapter 1202. The adapter 1202 may return Java™ objects to the factory layer 1206.

The Factory layer 1206 may call the following APIs to communicate with the social computing adapter 1202 of the Adapter layer:

InfoObject GetBasicInfo(integer UniqueID)
Returns a data object identified by the UniqueID of a participant
InfoObject[ ] GetInfo(String Attribute)
Returns a list of data for those who identified specific skills/experience/other attributes in their data
InfoObject[ ] GetInfo(GIS LocationCriteria)
Returns a list of data for those who meet static location criteria
GIS refers to Geographic Information Systems.

The engagement analytics layer (e.g., shown in FIG. 3 at 312) may perform the following analytics in one embodiment of the present disclosure.

Event Impact Analytics, based on pre-defined rules, links reported incidents and comments to impacted parties, actions, and possible outcomes. As a use case example of Event Impact Analytics, when a serious pothole report is submitted, the event impact analytics analyzes the impact of the reported event on the population of the city.

Incentive Design Analytics may generate various incentives such as points, badges, ranks, and so forth that are linked to reporting, polling, and other activities through Citizen Engagement Platform and evaluate the incentives that seem to be most effective. As a use case example of Incentive Design Analytics, higher points may be given to users with fast and valuable reports to have high impact. As another use case example of Incentive Design Analytics, give higher points to users with valuable comments that help shape the public hearing process.

Participant Behavior Analytics analyzes how participants in engagements behave under various conditions. As a use case example of Participant Behavior Analytics, the analytics tries to understand classes of participants that will communicate a pothole. Some users may report every pothole they see. Others may report only if it has impacted them in a negative way, yet others may report when they see reward points for their prior reporting, etc.

Participant Reputation Analytics analyzes the quality of participant input and links it to participant reputation to create varying degrees of trust in crowd-sensed data. As a use case example of Participant Reputation Analytics, some citizens may report even the smallest problems while others will only report if it is a big issue. Learning and associating a trust value to every participant input and using it to weigh and aggregate the overall degree of input from citizen participants help prioritize actions.

Engagement Effectiveness Analytics analyzes the amount of engagement being generated by various engagement mechanisms to evaluate the effectiveness of those mechanisms. As a use case example of Engagement Effectiveness Analytics, if recruitment is being conducted for an event through multiple marketing channels, this analytics may evaluate the effectiveness of each channel in terms of the success of recruitment.

Reaction Prioritization prioritizes possible choices of reactions based on participant reputation analysis and event impact analysis. As a use case example of Reaction Prioritization, if there are two potholes to fix and only one can be fixed next week, the reaction prioritization may be used to recommend the pothole that if fixed will lead to the best mitigation of impact of the pothole and the mitigation of the negative opinion generated by it.

Impact analytics may be a variation of the trust analytics.
The following illustrates analytics APIs in one embodiment of the present disclosure.
Task Trust Analytics
Input: Social Data Object, Activity Data Object
Argument: integer User ID (s), integer Activity Group ID
Output: array of User ID (s), integer Activity Group ID, integer Trust Metric
Task Impact Analytics
Input: Social Data Object, Activity Data Object
Argument: array of User ID (s), integer Activity Group ID
Output: array of User ID (s), integer Activity Group ID, GIS Location Coverage (or Time coverage)
Social Analytics
Input: Social Data Object, Activity Data Object
Argument: array of User ID (s), integer Activity Group ID
Output: array of User ID (s), integer Activity Group ID, and Social Weighted Network Graph Each API may be implemented as an atomic calculation routine for selecting and prioritizing participants for a specific activity task. For example, a social analytics API is used to identify individuals who have a greater influence so that a social message can propagate more effectively. Another example is a trust API that assigns a higher score for individuals who have higher trustworthiness for a specific input. An impact API is used to calculate who will be impacted by a specific event and an activity so that any inputs from the impacted individuals can be accounted properly.

Analytics APIs may be implemented as abstraction classes: e.g., impact abstraction class to implement Event Impact Analytics, trust abstraction class, prioritization abstraction class to implement Reaction Prioritization, behavior abstraction class to implement Participant Behavior Analytics, engagement effectiveness abstraction class to implement Engagement Effectiveness Analytics, incentive abstraction class to implement Incentive Design Analytics, and similarity abstraction class. A similarity API may use a set of clustering algorithms such as support vector machine, k-means, and others to cluster individuals into multiple clusters. A choice of distance metrics such as L-1 norm, Cosine distance and other well known metrics may be used to calculate the similarity between clusters.

A trust API calculates a trustworthiness score of individual based on a set of attributes that describe a characteristics of individual and prior knowledge of a subject matter. In addition, previously verified inputs may be used to assign a score towards the trustworthiness.

The following illustrates an example use case scenario of transit approval public hearing.

Trust Analytics calculate trust metric for a user by attribute types (e.g., responsiveness, quality of data, frequency of participation, and so forth). The analytics may be performed under the assumption that as EECEASPA runs, historical participation (and event) data is available for calculation. Three phases in which the analytics may be used are as follows:

Recruitment Phase:

When recruiting volunteers, pre-calculated trust metric values are used to prioritize a set of candidates that will contribute better than those who have smaller trust values. For example, in a transit approval scenario, one would like make sure that participation and response rate is high. In this case, highly responsive people (thus hold high trust metric value) may be chosen.

Progress Phase:

This phase reports on participation rate from trust-worthy volunteers and creates a list of future volunteers.

Evaluation Phase:

When analyzing data once an activity is completed, trust metrics are used to give different weight (to improve the reliability of the response). For example, in a transit approval scenario, one would want to put higher weight to those who actually have ridership.

Impact Analytics calculates impact metric for a user by attribute types (e.g., geographical coverage (polygon, list of zip code, etc.), time-of-day event distribution). This analytics may assume that EECEASPA runs, historical participation (and event) data is available for calculation. Three phases in which the analytics are used may be as follows:

Recruitment Phase:

An activity has coverage requirement. This pre-calculated coverage metric is used to cover the area of interest when recruiting people. For example, in a transit approval scenario, one would want to make sure that opinions are collected from those who are affected by the transit route changes. This analytics allows finding candidates who need to be recruited.

Progress Phase:

This phase provides for run-time coverage impact graph, and helps monitor activity progress in terms of coverage map and identify where an activity owner should recruit more people (and encourage more participation).

Evaluation Phase:

When analyzing data once an activity is completed, impact metrics are used to normalize responses from different geographical areas at different time. For example, in a transit approval scenario, one would want to put higher weight to those who actually have ridership within the changed routes at different time.

Social Analytics identifies social links by hierarchical structure, friendship, historical collaboration through activities, and so forth. This analytics may assume that as EECEASPA runs, historical participation (and event) data is available for calculation. Two phases in which the analytics may be used are as follows:

Recruitment Phase:

When recruiting people for an activity, it would be easier to propagate messages through social links. The identified social links is used for improved communication methods. In some cases, one may want to avoid over-participation from a group of people, for example, large number of people from a local interest group to vote for their interest. For example, in a transit approval scenario, one would want to make sure that opinions come from a diverse group of people to reduce bias. As the recruiting is in progress, this social links are used to identify which group of people should be recruited more.

Evaluation Phase:

When analyzing data once an activity is completed, social links are used to reduce bias due to social relationships. For example, in a transit approval scenario, if many data points from members of a bus company are gathered, one would want to make sure that one gets as many data points from non-members.

For social communication adapters, there may be following two data structures, e.g., Information (for users, anonymous and registered) and Community (for organizations/groups, social relationships related data), Information, Community, and Communities may be defined according the definition of Information, Community, and Communities in IBM Lotus Connections™ (Connections portal) from International Business Machines (IBM®) of Armonk, N.Y.

Examples of the data fields of Information and Community and the APIs to be invoked by the analytics layers to query information it needs are shown in Table 2. These APIs definition are from IBM Lotus Connection and used as-is. The description below is to show their usage in this disclosure.

TABLE 2

The Example definition and Usage Profile and Community APIs

Profile definition:
UID - unique id that identifies the participant
role (anonymous, admin, city staff, mayor, volunteer, campaigner, etc. ...)
zip code (home location) - zip code of the participant
home GIS location
title
first name
last name
address
mobile - mobile phone number
device Id - smart phone device ID
preferredContactMethod - e.g. email, phone, text, etc.
Information APIs:
Information getInformation(String uid);
Information may be for a user of the site who performs these activities on the site: e.g., follow, submit or comment on events or whose comments are being followed or commented on, etc.
Information may contain location information such as zip code and other location information, e.g., which can be extracted from the city database with the permission from city, or obtained from mobile phone (GIS info).
Usage scenarios:

TABLE 2-continued

The Example definition and Usage Profile and Community APIs

1. The location information can be used to determine coverage of how people signing up with a campaign.
Community APIs:
Community definition:
Name - name of the community
contact UID - contact UID of the community
phone number - phone number of the community
The location information can be used to filter data by location proximity, e.g., find my friends within 5 miles radio of where I live.
Community getCommunity(String user, integer miles);
Get community of this uid (user) within a certain miles.
Use case: Alex wants to start a campaign within 5 miles
Location filtering can be done in profile adapter.
Community getCommunity(String uid);
Get community of this uid without specifying location proximity.
Community also can contain information of following event, followed events, members of and relationship information including recent contact, activity log, relationship, in groups.

Social media communication adapter APIs (e.g., part of the adapter layer shown in FIG. 4 at 406) for performing Impact and Trust Analytics (e.g., part of the engagement analytics layer shown in FIG. 4 at 412) may include the following APIs:

SocialNetworkObject GetSocialLinks (integer Unique ID, String SocialType)
  Returns a network of UID for a unique ID by social types
  Types include hierarchical (in job setting), friendship, collaboration, and so forth
  Result PushInfo(Unique ID, SocialInfoObject)
  Allow to push information to connections database from EECEASPA layer
  This API is used to push a list of individuals of target.

Figure 27:
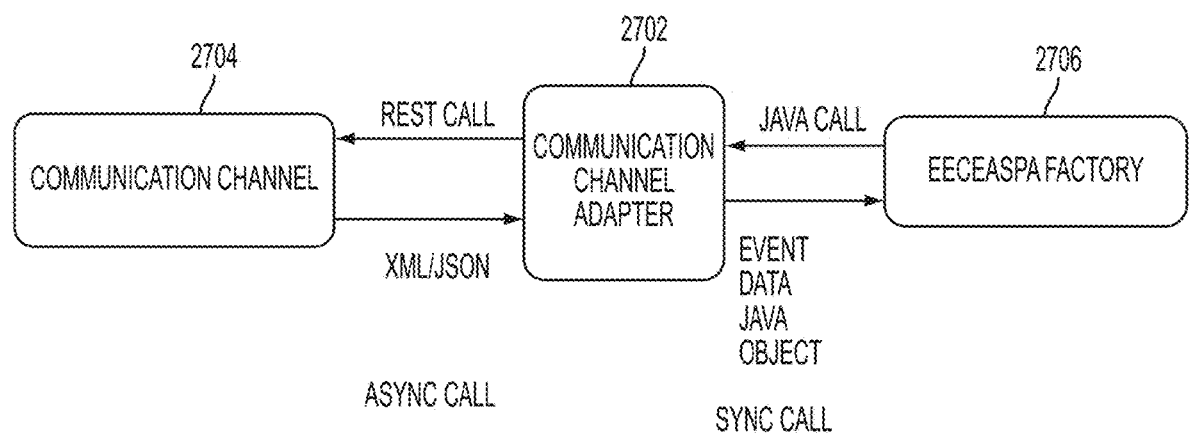
FIG. 27 illustrates software module interaction and APIs in EECEASPA factory layer in one embodiment of the present disclosure.

FIG. 27 illustrates software module interaction and APIs in EECEASPA factory layer in one embodiment of the present disclosure. An adapter layer (e.g., communication channel adapter) 2702 may use a REST call to communicate with a data source (e.g., City or like data) 2704. The data source may communicate an XML or JSON data to the adapter 2702. The communication between the adapter 2702 and the data source 2704 may be in asynchronous mode. The factory layer 2706 may use a Java™ call to communicate with the adapter 2702. The adapter 2702 may return Java™ objects to the factory layer 2706.

The following APIs may be called by the EECEASPA factory layer 2706 retrieve data from the Adapter layer 2702:

Event[ ] GetAllEvents (integer Unique ID)
  Returns all the events submitted by the user as identified by the Unique ID
Event[ ] GetEvents(integer Unique ID, String Task Type)
  Returns vents that a user submitted by task type (e.g. activity type)
Event[ ] GetEvents(integer Unique ID, integer Task ID)
  Returns events of a user for a specific task ID (e.g. activity ID)

As an example, the APIs and its inputs and outputs of the Trust Analytics of the engagement analytics layer are described as follows. Input to the Trust Analytics module that computes trust metrics may include attribute names and trust calculation rules, which defines the weight of each attribute name based on the nature of the activity. For example, for a transit activity, an activity designer would define three key attributes: ('experience', 'assign 0.3 if experienced in mass transit industry'); ('jobResp', 'assign 0.5 if responsibility includes x, y, or z' related to mass transportation); ('location', 'assign 0.2 if location is within 10 miles from zip code 1x201'). The Trust Analytics also receives as input, such data like XML formatted data that is integrated into the data model (e.g., FIG. 5 at 522), by a factory layer (e.g., FIG. 5 at 520) from social media communication channel (e.g., FIG. 5 at 506) via an appropriate adapter (e.g., FIG. 5 at 504) in the adapter layer (e.g., FIG. 5 at 502). The data the factory layer (e.g., FIG. 5 at 520) process may include information like "John was a former member of local Department of Transportation (DoT) responsible for improving ridership in the city, but does not live in the zip code 1x201." The Trust Analytics module then may output, "John has initial trust level of 0.8." where 0.8 is the trust metric representing the trust level.

In another example, Trust Analytics (for processing 'Prior Activities/Tasks') API and its Inputs and Outputs are described as follows. Inputs to the Trust Analytics module may include task type and trust calculation rules, which define the weight of the task. For example, an activity designer defines input as ('Voting', 'Calculate average response rate'). Using data from data sources (e.g., City public data received via the adapter layer and integrated into the data model by the factory layer) such as "John has participated in 10 voting activities, and actually voted 8 times," the Trust Analytics module may output, "John's response rate for voting activities is 0.8."

In one embodiment of the present disclosure, Trust API member functions of the
TrustAnalytics may include the following:
Trust(SocialData, Activity)
SocialData—a data structure, e.g., Java™ class, that describes data of a participant, which may include a Unique ID that identifies the participant, job type, location, e.g., zip code, name, address, etc.
Activity—a data structure, e.g., Java™ class, that describes an activity, which may include the goal and/or objective, duration, total budget, etc.
Public IndividualMetrics getMetrics( )—Return the set of metrics computed for the participant.
Public Boolean updateMetrics( )—Returns 'true' if metric are updated successfully, 'false' otherwise.
Public Boolean calculateMetrics( )—Returns 'true' if metric are calculated successfully, 'false' otherwise.

Figure 28:
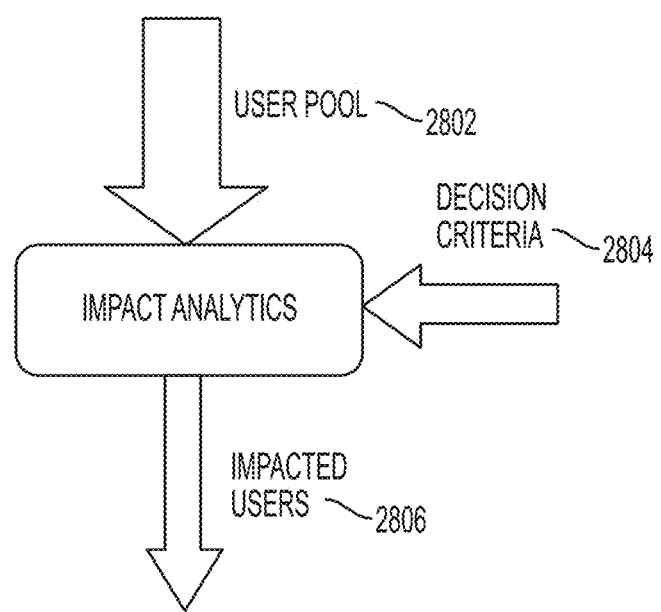
FIG. 28 is a diagram showing an example of input and output for Impact Analytics in one embodiment of the present disclosure.

FIG. 28 is a diagram showing an example of input and output for Impact Analytics (e.g., part of engagement analytics layer shown in FIG. 5 at 524) in one embodiment of the present disclosure. The Impact Analytics shown in FIG. 28 filters by criteria. Input 2802 to this analytics may include an array list of unique IDs of participants (ArrayList<Long> uniqueIDs). Argument (another input 2802) may include an array list of criteria 2804. 'Criteria' is a data structure, e.g., Java™ class that describes individual attributes and conditions (e.g., geographical range, demographic information, financial status). Output 2806 of this analytics may include an array list of impacted unique IDs (participants).

As another example, Impact Analytics and its inputs and outputs are described as follows. Inputs may include attribute name and impact calculation rule. For example, an activity designer defines three key attributes: 'location', 'extract location tags from social media activities'. Impact Analytics uses data obtained from data sources via one or more appropriate adapters of the adapter layer and integrated by the factory layer to produce its output. Example data may include "John had home location, and location tags throughout wiki/forum activities, indicating his coverage data." The Impact Analytics module may produce as output, "John's coverage impact is represented in an ordered list of location traces." Data searching, data mining or extraction, and/or text processing techniques may be used to produce such output.

Yet as another example, Impact Analytics (Prior Activities) and its inputs and outputs are described as follows. Inputs may include task type, impact calculation rules). For example, an activity designer defines inputs as: ('Picture Taking', 'Heat map of prior activities'), ('Picture Taking', 'Time of day distribution of prior activities'). Impact Analytics uses data obtained from data sources via one or more appropriate adapters of the adapter layer and integrated by the factory layer to produce its output. Example data may include, "John has been reporting various pictures through many prior activities." The Impact Analytics module may produce as output, "John's historical impact is represented in the form of heat map of prior activities as well as time of day distribution."

In one embodiment of the present disclosure, Impact Analytics API member functions may include:

Impact(SocialData, Activity)

SocialData—a data structure, e.g. Java™ class, that describes data of a participant, which may include a Unique ID that identifies the participant, job type, location, e.g., zip code, etc.

Activity—a data structure, e.g., Java™ class that describes an activity, which may include the goal and/or objective, duration, total budget, etc.

Public ArrayList<String> getSocialImpact( )

Returns a list of social impacts.

Public Boolean geographicallyImpacted( )

Returns 'true' if the participant is geographically Impacted, 'false' otherwise.

Public Boolean temporallyImpacted( )

Returns 'true' if the participant is temporally Impacted, 'false' otherwise.

Public Boolean sociallyImpacted( )

Returns 'true' if the participant is socially impacted, 'false' otherwise.

In one embodiment of the present disclosure, Recruitment API member functions may include:

Recruitment(SocialData, Activity)

SocialData—a data structure, e.g., Java™ class, that describes data of a participant, which may include a Unique ID that identifies the participant, job type, location, e.g., zip code, etc.

Activity—a data structure, e.g., Java™ class that describes an activity, which may include the goal/objective, duration, total budget, etc.

Public Boolean isTarget( )

Returns 'true' if the participant is among the targeted population for the activity, 'false' otherwise.

Public Boolean isRecruited( )

Returns 'true' if the participant is recruited for this activity, 'false' otherwise.

Public Boolean hasViewed( )

Returns 'true' if the participant has viewed this activity, 'false' otherwise.

Public Boolean needReminder( )

Returns 'true' if the activity needs to send out a reminder to participants, 'false' otherwise.

Public String bestChannel( )

Returns the best channel for the activity, e.g., the channel that has recruited the most participants.

Public Boolean needPublicityblast( )

Returns 'true' if the activity needs a Publicity blast, 'false' otherwise.

. . .

Public String returnEmail( )

Returns the participant's email address.

Public String dataID( )

Returns the participant's dataID.

Public Integer viewCount( )

Returns the count of the number of viewers of the activity.

Figure 19:
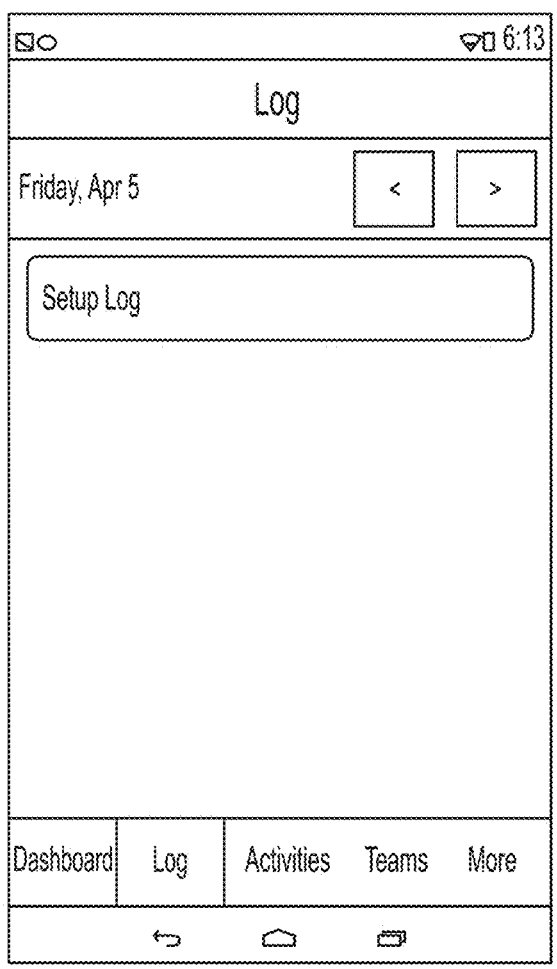
Figure 20:
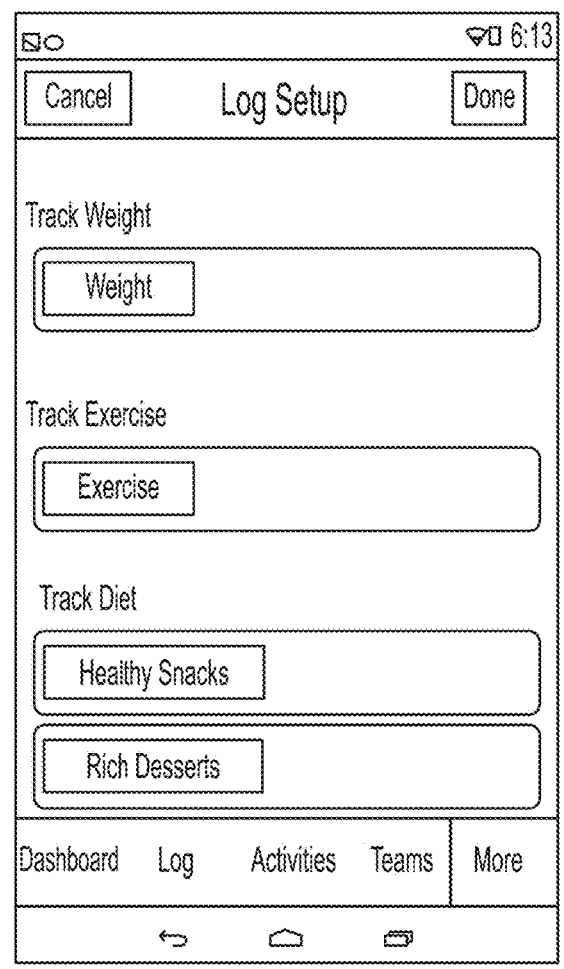
Figure 21:
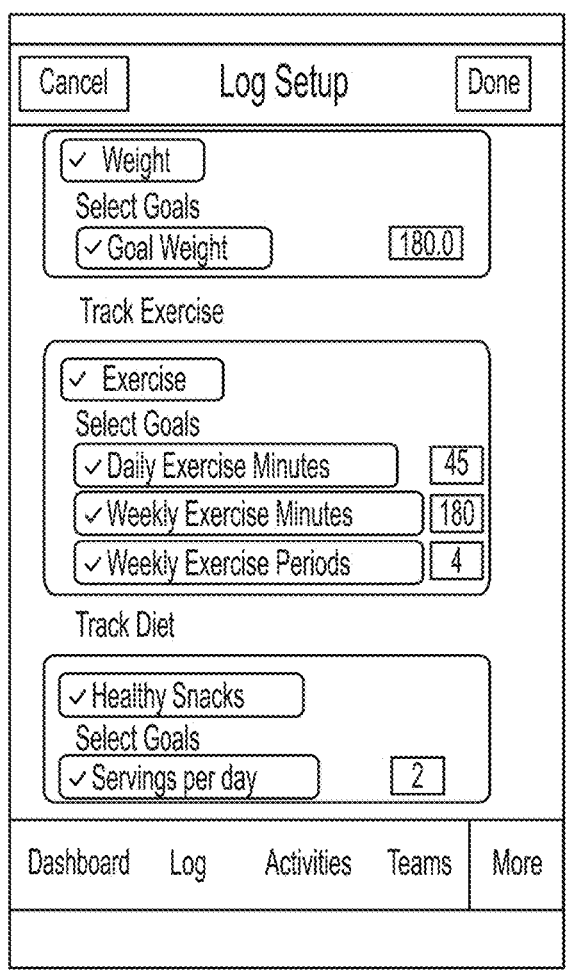

CEP App (e.g., FIG. 3 at 316) provides functionalities for logging, editing, adding entries of physical activities (e.g., shown in FIG. 15, FIG. 16, FIG. 17, FIG. 18), diet and weight (e.g., shown in FIG. 19, FIG. 20, FIG. 21). For example, CEP App allows participants to enter their own physical activities, e.g., number of minutes spent on running, busing, driving, and also the intensity of the physical activities, e.g., low, moderate, high. Using CEP App, participants may also enter information such as the quantity of certain foods consumed, e.g., fruits/vegetable servings, snacks, rich desserts, etc.

CEP App also allows for goal setting, logging based on goals, and monitoring and tracking of the progress of the goals (e.g., FIG. 19, FIG. 20, FIG. 21). For example, a participant may set individual goal and log associated data based on the goals. For instance, users (participants) may log the type and quantity of certain foods consumed, e.g., snacks, fruits/vegetable servings, deserts, etc., and eating frequencies/intervals, weight, and physical activities.

The individual assistant App, CEP App, also enables team comparison and/or comparison with anonymous aggregate data of other participants. For example, physical activities of a participant or a group of participants (team) may be compared with statistic data such as Average Walking Minutes of all active users of the CEP App (e.g., per day, per week), Average Running Minutes of all active users (e.g., per day, per week), Average Driving Minutes of all active users (e.g., per day, per week). As another example, diet of a participant or a group of participants (team) may be compared with statistic data such as Average quantity of certain foods consumed, e.g., fruits/vegetable servings, snacks, rich desserts, etc., of all active users (e.g., per day, per week), Average frequency/interval of certain foods consumed of all active users (e.g., per day, per week). Yet as another example, weight of a participant or a group of participants (team) may be compared with statistic data such as Average weight of all active users (e.g., most recent).

CEP App may be a mobile application downloaded and installed on a user's mobile device, e.g., smartphone. CEP App may provide authentication functionalities to authenticate a user to use the CEP App. For example, CEP App may display a login screen for the user to enter a user ID and password in order to access and use the application. Also, a user may be presented with an end user license agreement (e.g., on a display screen of the mobile device), which the user would agree to accept, e.g., by clicking a button on a display screen. In one aspect, the login information (e.g., user ID and password) may be provided by a city, e.g., the CEP platform owner.

FIGS. 13-26 shows example user interface screens of the CEP App, via which a participant may enter data, view data, and otherwise interact with the CEP of the present disclosure in one embodiment. The CEP App may display summary screen from which a user may be able to navigate to a dashboard page (screen display), logging page (screen display), activities page (screen display), teams page (screen display), and a page (screen display) of more functionalities.

Dashboard may show three possible pages: Wellness page shows Summary Statistics; Smarter Water page can show smarter water meter data, provided that there is a smart meter for water; Smarter Electricity page can show smarter electric meter provided that there is a smart meter for electricity data. FIG. 13 shows an example wellness dashboard that may be displayed by the CEP App in one embodiment of the present disclosure. Wellness page may show summary statistics such as displaying high-level statistics of physical activities: e.g., number of minutes spent on driving, running, walking. Wellness page may also show messages such as historical activity data, reminders. Wellness page may also show a disclaimer, for users to review.

Figure 14:
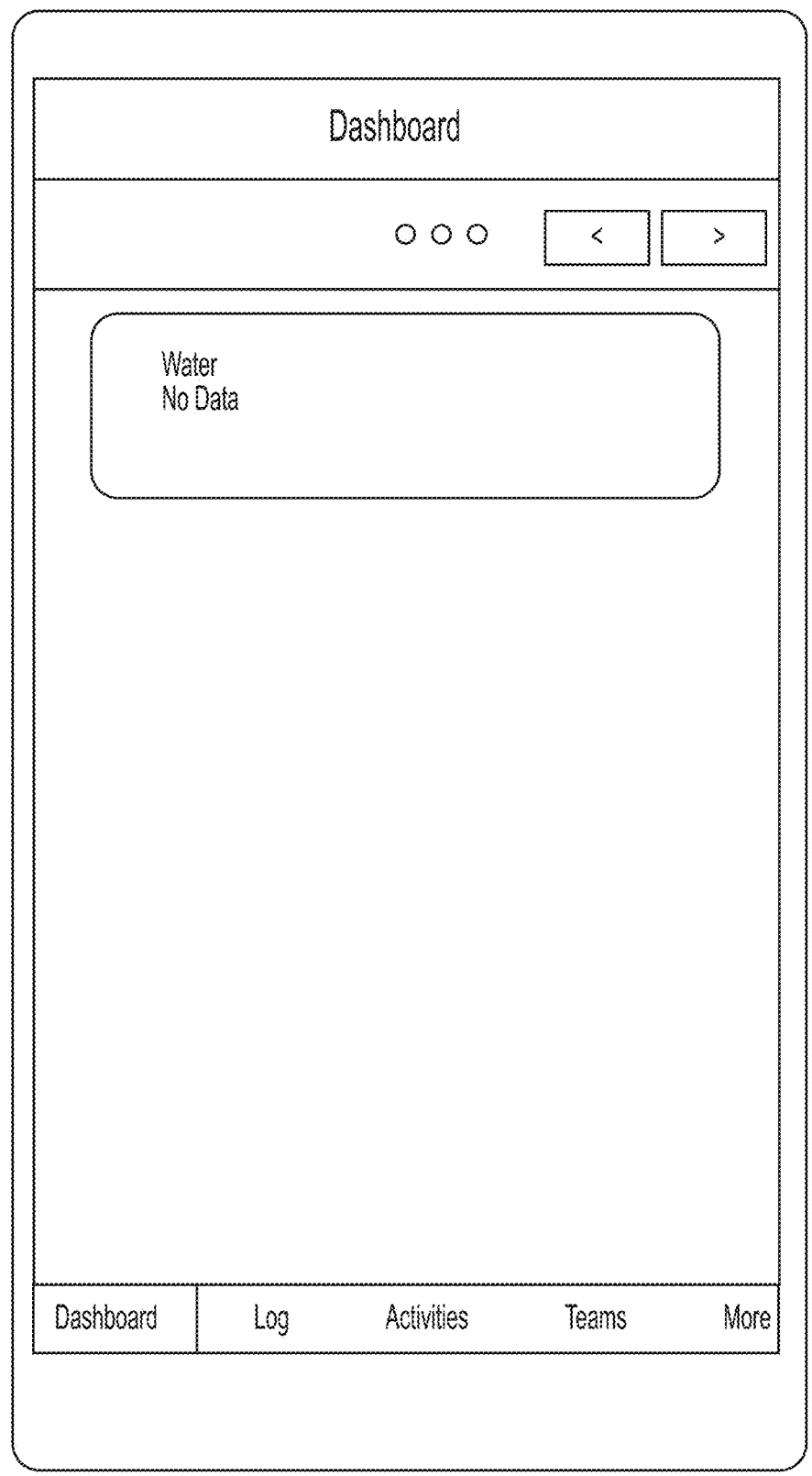

In one embodiment of the present disclosure, smarter water and/or smarter electricity data may be linked with CEP App. For example, if a user owns an anonymous unique identifier (UID) that was previously used to participate in the Smarter Water Portal and/or the Smarter Electricity Portal (aka "Primary UID"), the user may be able to see his water data and/or electricity data associated with the user's smart meters when using this UID to log in. Any other UIDs assigned by the City can only see the person's own wellness data but can be added by a "Primary UID" and be authenticated to see the view of water and/or electricity data associated with the user. For example, FIG. 14 shows another Dashboard page, on which a UID that is not associated with any water smart meter, cannot see any water.

Logging page enables logging, goal setting, monitoring/tracking based on goals of physical activities, diet and weight. FIG. 19 shows an example logging page. A user can select 'Setup Log' from Log page to add entries in 'Log Setup' page to enable tracking. FIG. 20 shows an example log setup page. FIG. 21 shows a log setup entry page via which a user may enter goals, and track progress.

Figures 15, 16:
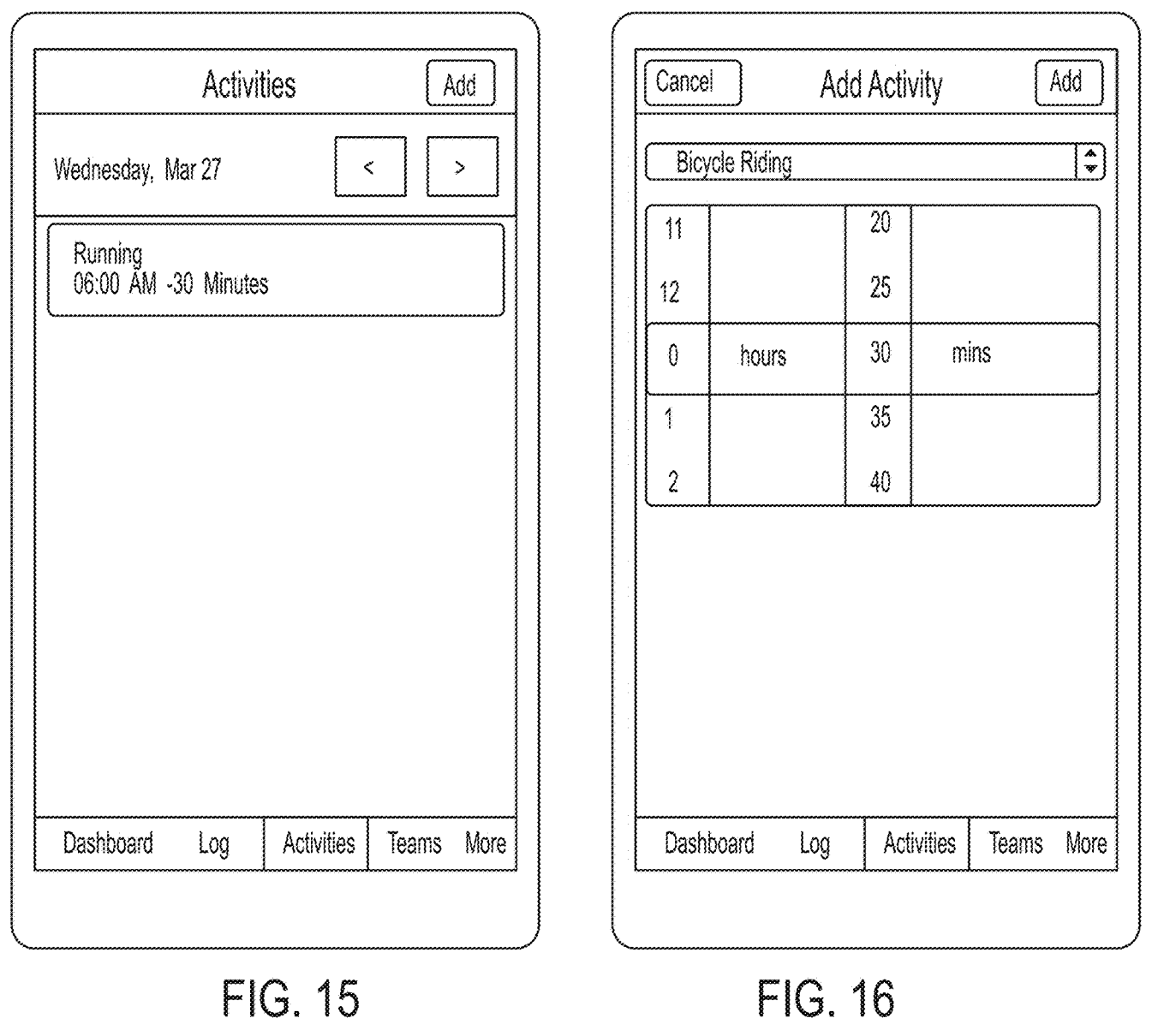
Figures 17, 18:
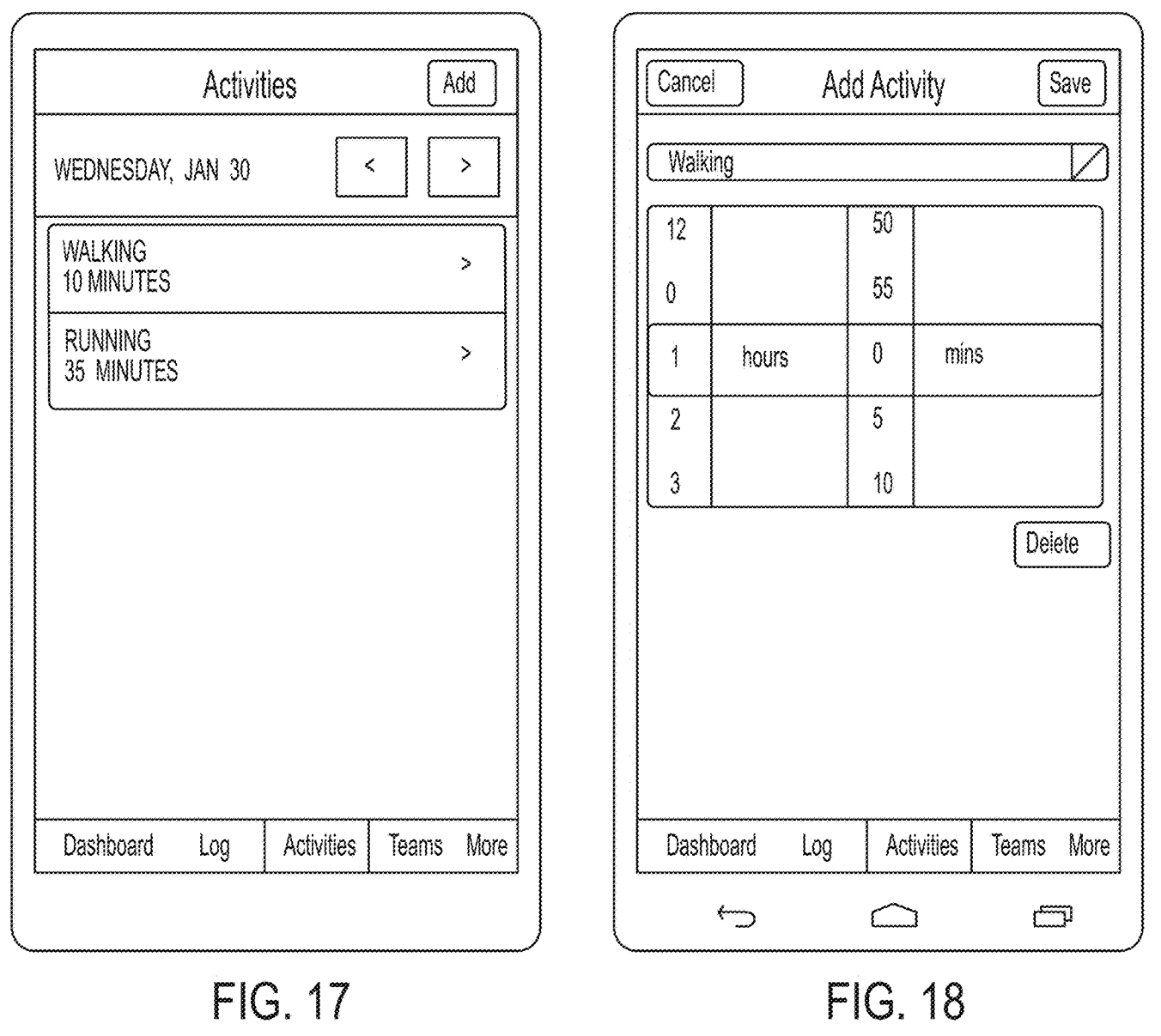

Activities page displays users' physical activities history for users to review and enables users to add new activities as well as edit/correct the activities from the history. FIG. 15 illustrates a physical activities and history display page in one embodiment of the present disclosure. FIG. 16 illustrates a page through which entries may be added. For instance, selecting (e.g., clicking) an 'add' button from the activities page (FIG. 15) may display the 'add activity' page shown in FIG. 16. FIG. 17 is another example screen illustrating a physical activities page in one embodiment of the present disclosure. FIG. 18 shows another example of a page via which entries may be edited. For instance, selecting (e.g., clicking) an activity (e.g., 'walking') from the activities screen show in FIG. 17 may navigate to the display shown in FIG. 18 for editing the 'walking' activity.

'Teams' page shows comparison with anonymous aggregate data of other participants based on the goals. For example, users can start one or more new team with some description of the team's objective, e.g., healthy eating or weight loss, etc. and invite others to join the team. Functions for teams may include: create, join, leave, delete the team (function names could change but capabilities would be similar to what's described here). Via the 'teams' page, users may view comparisons of their own data with anonymous aggregate data of other participants. For example, user's physical activities can be compared with Average Walking Minutes of all active users (e.g., per day, per week), Average Running Minutes of all active users (per day, per week), Average Driving Minutes of all active users (e.g., per day, per week); user's diet information may be compared with Average quantity of certain foods consumed, e.g., fruits/vegetable servings, snacks, rich desserts, etc., of all active users (e.g., per day, per week), Average frequency and/or interval of certain foods consumed of all active users (e.g., per day, per week); user's weight information may be compared with Average weight of all active users (e.g., most recent).

Figure 22:
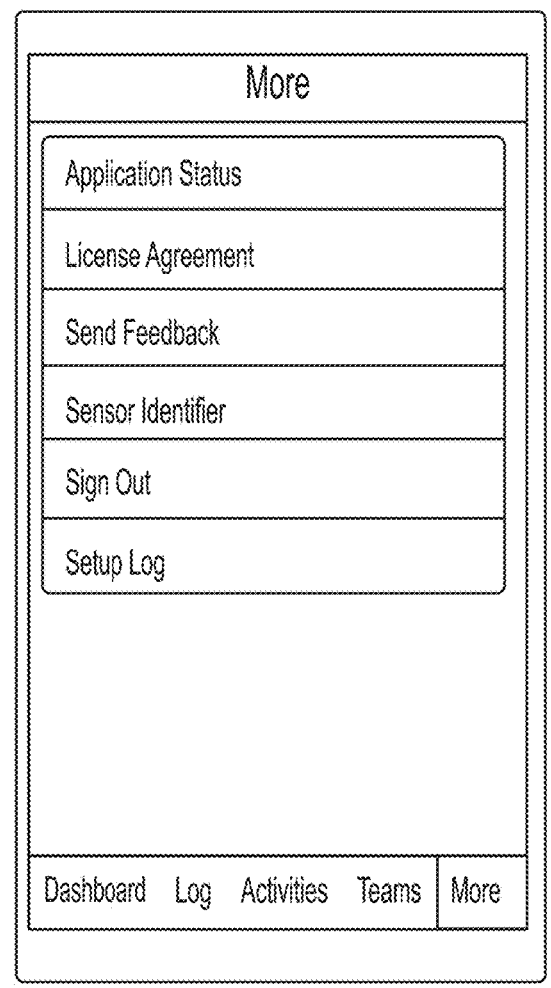
Figure 23:
Figure 24:
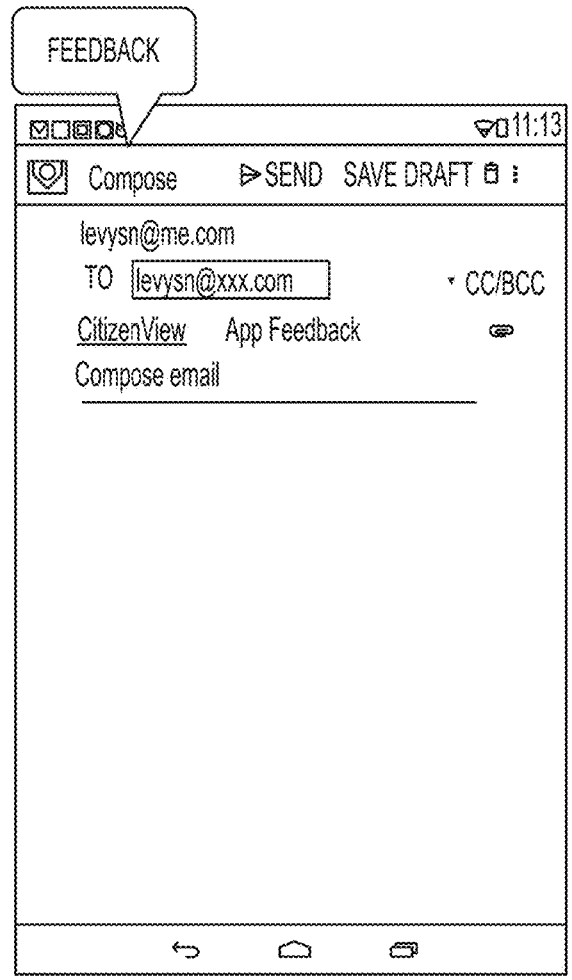
Figure 25:
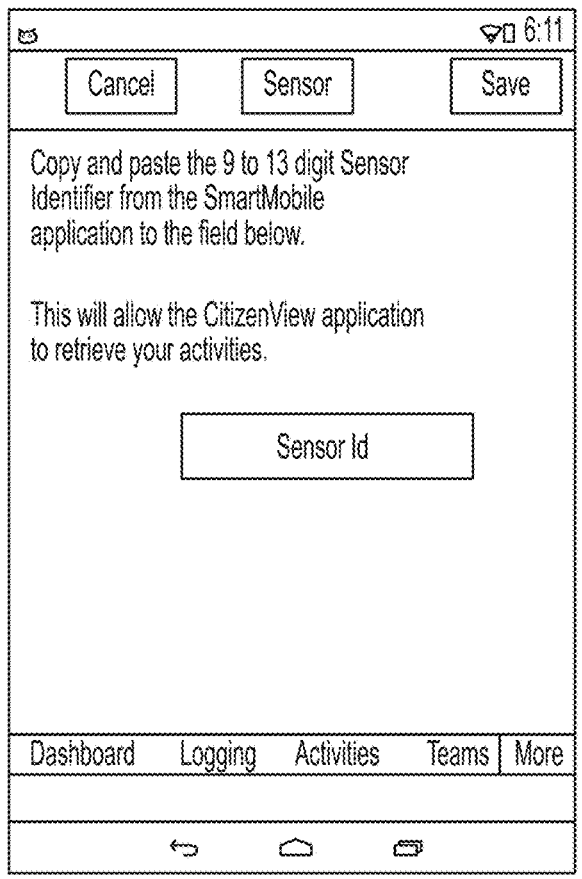
Figure 26:
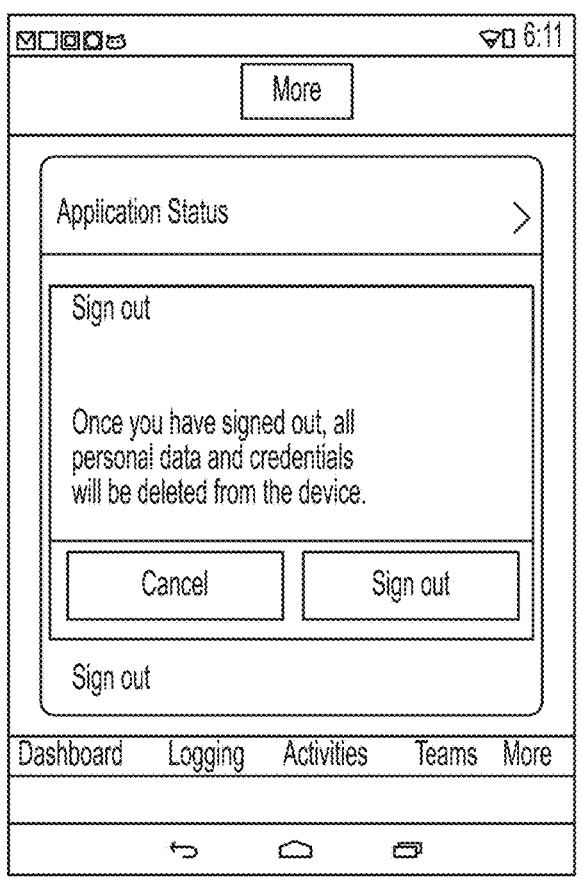

'More' page may show additional functions, e.g., which may be used less frequently. For example, 'more' page may include the following menu items: Application Status shows application, network, and device information; License Agreement shown for the first time use of the App; Send Feedback enables users to send comments via email; Sensor Identifier enables the App to retrieve user's activities based on the sensor ID; Sign Out logs a user off the App; Setup Log enables users to set up goals for monitoring and tracking. FIG. 22 shows an example 'more' page in one embodiment of the present disclosure. FIG. 23 shows 'application status' page navigated from the 'more' page in one embodiment of the present disclosure. FIG. 24 shows a page navigated from the 'more' page, through which feedback may be composed. FIG. 25 shows an example 'sensor' page via which a user may enter a sensor ID. CEP App then may communicate with the identified sensor to automatically retrieve sensor data from the sensor device identified by entered sensor ID. FIG. 26 shows an example of a log out page in one embodiment of the present disclosure, which a user may use to sign out of CEP App.

In another aspect of the present disclosure, method and apparatus for conducting effective surveys and improving the return of user participation rate through impact analysis and tuning may be provided. A method and apparatus for conducting effective surveys and improving the return of user participation rate through impact analysis and tuning may improve the return of user participation rate for an effective survey based on impact analysis, analyze user's potential impact to the survey based on a set of selected attributes such as financial, age, location, education, attitude, etc., for a targeted scenario or scenarios, and tune and adapt the survey to a set of targeted candidates based on the selected attributes to improve the rate of user participation. Such method and apparatus may provide a reminder mechanism that adjusts frequency and communication channels by analyzing past survey response characteristics of similar participants wherein similar participants were the participants who have similar demographic attributes.

Yet in another aspect of the present disclosure, method and apparatus for effectively analyzing the accuracy and trustworthiness of survey answers through reputation analytics may be provided. A method and apparatus for an effective way of analyzing the accuracy or trustworthiness of the survey answers through reputation analytics may identify the participant's reputation based on prior participation activities, e.g., prior responses to survey questions and citizen engagement programs, as well as social data, etc. Such method and apparatus may analyze and aggregate survey answers based on each participant's level of trustworthiness via one or more criteria, e.g., reliability, responsiveness, prior experience, and prior survey activities, etc. . . . . Such method and apparatus may also quantify a participant's trustworthiness for a target survey based on the goals and contexts of the survey. Such method and apparatus may also analyze the trustworthiness of a participant via reputation analytics that combines one or more attributes, e.g., a person's occupation, individual experience, the composition of a person's prior survey participation history based on a tuple of (correctness, consistency, relevance), and education level, etc., and provide a context parsing and data gathering mechanism that analyzes survey contents and corresponding attributes of each participant.

Yet in another aspect of the present disclosure, method and apparatus for improving survey participation rate with an incentive mechanism may be provided. A method and apparatus for improving survey participation rate with an incentive mechanism that optimizes the incentive returns may analyze and aggregate survey types and goals to identify target customers and incentives. Such method and apparatus may analyze target customers and incentives by using results of similar surveys conducted previously; Identify target customers based on demographic attributes for those who with high tendency to respond to changes in incentive amount, frequency, and latency; Calculate incentives based on changes in response rates at the time incentives are given; Provide an incentive delivery mechanism where the incentive analytics divides the total amount of incentives provided at the survey design time into smaller chunks where each smaller chunk is being offered to those who will likely accept it by completing survey questions to increase the potential response rate of the participants; and optimize the incentive returns by identifying the 'optimal' amount of the incentive of the smaller chunk so as to maximize the number of participants that can receive the incentive, and deliver it in a variable amount for the smaller chunk based on a participant's reputation and/or trustworthiness, e.g., more incentive for more trustworthy participants.

Yet in another aspect, method and apparatus for automated and effective sensing, detecting, and classifying human micro mobility activities to produce accurate classification of the type and duration of an activity may be provided. A method and apparatus for automated and effective sensing, detecting, and classifying human micro mobility activities to produce accurate classification of the type and duration of an activity may sense the human daily micro mobility activities, e.g. jogging, jumping, stepping motion, e.g., treadmill, stepping up and down, e.g., aerobic exercises, using sensing devices, e.g. mobile phone; Engage users to actively give feedback in a diary and/or other logging and add new activities that are not sensed by the system; Enable user-assisted learning to allow users to edit and reclassify system logged activities to improve accuracy; Detect patterns of misclassification; and Automatically correct misclassification through learning obtained iteratively through data provided by users, e.g., new and edited activities.

Figure 29:
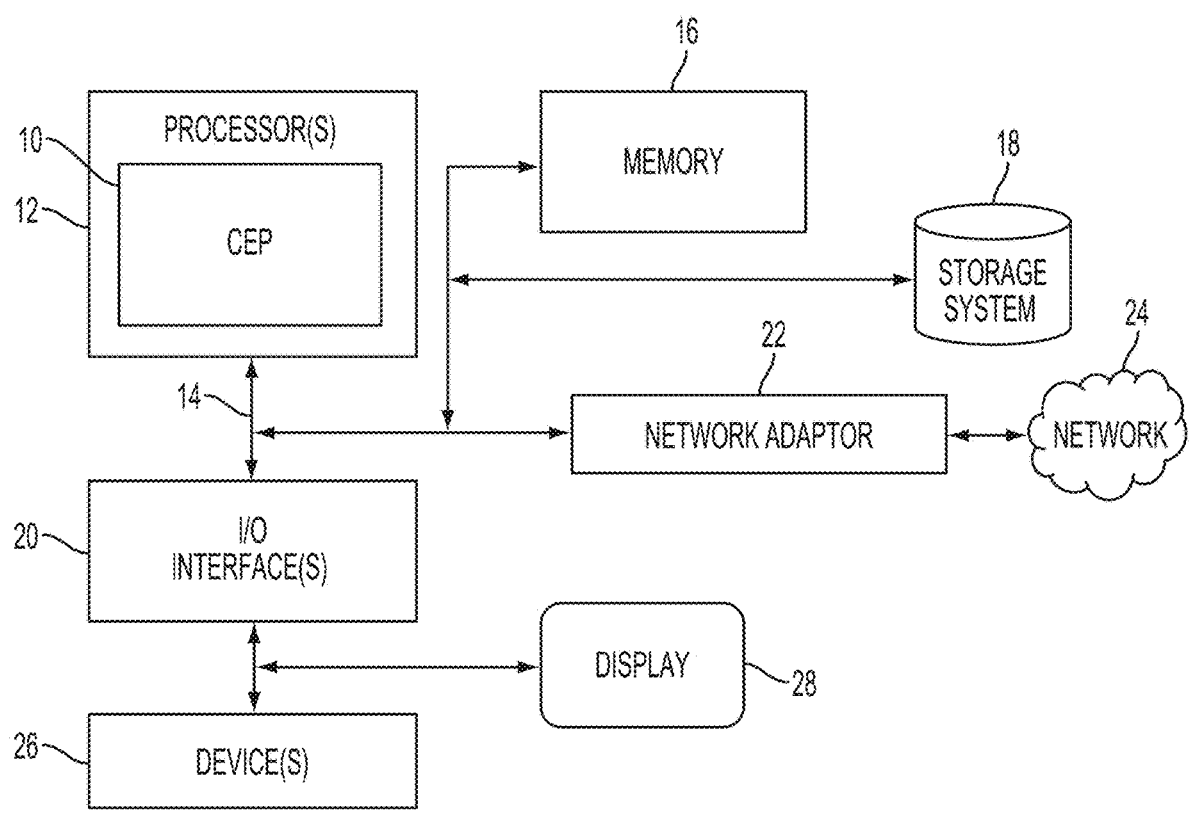
FIG. 29 illustrates a schematic of an example computer or processing system that may implement a system in one embodiment of the present disclosure.

FIG. 29 illustrates a schematic of an example computer or processing system that may implement a CEP system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 29 may include, but are not limited to, computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may implement CEP functionalities 10 that perform the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:
1. A computer-implemented method, comprising:
receiving data, by a computer processor, from a plurality of sources through a network, wherein at least some of the sources are disintegrated sources;
refactoring and integrating, by the computer processor, the data according to the data model as data attributes of the data model;
performing, by the computer processor, at least one analytics based on at least some of the data attributes and input specified to the at least one analytics, the at least one analytics performing at least a trust analytics that determines a trust metric for a participant associated with an engagement activity, the trust analytics performed at least as a function of the participant's experience in subject matter associated with the engagement activity, job responsibility within an industry associated with the subject matter, and geographic location within an area associated with the engagement activity, the trust metric input to an evaluation phase to provide a different weight to a response of the participant, the at least one analytics performed at least as a function of the different weight associated with the participant; and
transmitting to a client device, by the computer processor, in real time at least one result computed by performing the at least one analytics, the at least one result including at least a trust level associated with the participant.

2. The computer-implemented method of claim 1, wherein at least some of the data comprises sensor data.

3. The computer-implemented method of claim 1, further comprising executing an application programming interface to communicate with at least one of the sources to receive at least some of the data.

4. The computer-implemented method of claim 1, further comprising providing an application for detecting at least some of the data.

5. The computer-implemented method of claim 1, wherein the at least one result indicates at least an effectiveness of a program within the area.

6. The computer-implemented method of claim 5, wherein the effectiveness is determined based on aggregated data aggregating at least some of the data as a function of different weights associated with different participants of the engagement activity, the different weights assigned based on performing the trust analytics.

7. A computer program product comprising a non-transitory computer readable storage medium having program instructions embodied therewith, the program instructions executable by a device to cause the device to:
receive data from a plurality of sources through a network, wherein at least some of the sources are disintegrated sources;
refactor and integrating the data according to the data model as data attributes of the data model;
perform at least one analytics based on at least some of the data attributes and input specified to the at least one analytics, the at least one analytics performing at least a trust analytics that determines a trust metric for a participant associated with an engagement activity, the trust analytics performed at least as a function of the participant's experience in subject matter associated with the engagement activity, job responsibility within an industry associated with the subject matter, and geographic location within an area associated with the engagement activity, the trust metric input to an evaluation phase to provide a different weight to a response of the participant, the at least one analytics performed at least as a function of the different weight associated with the participant; and transmit to a client device in real time at least one result computed by performing the at least one analytics, the at least one result including at least a trust level associated with the participant.

8. The computer program product of claim 7, wherein at least some of the data comprises sensor data.

9. The computer program product of claim 7, wherein the device is further caused to execute an application programming interface to communicate with at least one of the sources to receive at least some of the data.

10. The computer program product of claim 7, wherein the device is further caused to provide an application for detecting at least some of the data.

11. The computer program product of claim 7, wherein the at least one result indicates at least an effectiveness of a program within the area.

12. The computer program product of claim 11, wherein the effectiveness is determined based on aggregated data aggregating at least some of the data as a function of different weights associated with different participants, the different weights assigned based on performing the trust analytics.

13. A system comprising:
a hardware processor; and
a memory device couple with the hardware processor;
the hardware processor operable to at least:
receive data from a plurality of sources through a network, wherein at least some of the sources are disintegrated sources;
refactor and integrating the data according to the data model as data attributes of the data model;
perform at least one analytics based on the data attributes and input specified to the at least one analytics, the at least one analytics performing at least a trust analytics that determines a trust metric for a participant associated with an engagement activity, the trust analytics performed at least as a function of the participant's experience in subject matter associated with the engagement activity, job responsibility within an industry associated with the subject matter, and geographic location within an area associated with the engagement activity, the trust metric input to an evaluation phase to provide a different weight to a response of the participant, the at least one analytics performed at least as a function of the different weight associated with the participant; and
transmit to a client device in real time at least one result computed by performing the at least one analytics, the at least one result including at least a trust level associated with the participant.

14. The system of claim 13, wherein at least some of the data comprises sensor data.

15. The system of claim 13, wherein the hardware processor is further operable to execute an application programming interface to communicate with at least one of the sources to receive at least some of the data.

16. The system of claim 13, further the hardware processor is further operable to provide an application for detecting at least some of the data.

17. The system of claim 16, wherein the at least one result indicates at least an effectiveness of a program within the area.

18. The system of claim 17, wherein the effectiveness is determined based at least on aggregated data aggregating at least some of the data as a function of different weights associated with different participants, the different weights assigned based on performing the trust analytics.

* * * * *